US012632768B2

(12) United States Patent
Pokharel et al.

(10) Patent No.: US 12,632,768 B2
(45) Date of Patent: May 19, 2026

(54) IDENTIFYING A DYNAMICAL DECOUPLING SEQUENCE FOR ERROR SUPPRESSION OF QUANTUM COMPUTATIONS USING A GENETIC ALGORITHM

(71) Applicant: International Business Machines Corporation, Armonk, NY (US)

(72) Inventors: Bibek Pokharel, San Jose, CA (US); Christopher Tong, Boston, MA (US); Helena Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 18/395,820

(22) Filed: Dec. 26, 2023

(65) Prior Publication Data

US 2025/0209365 A1      Jun. 26, 2025

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ...................................................... G06N 10/70
See application file for complete search history.

(56) References Cited

U.S. PATENT DOCUMENTS

| | | | | |
|---|---|---|---|---|
| 11,281,988 B1 * | 3/2022 | Naveh | ..................... | G06N 10/20 |
| 11,615,337 B1 * | 3/2023 | Naveh | ..................... | G06N 10/20 |
| | | | | 714/10 |

(Continued)

FOREIGN PATENT DOCUMENTS

| | | |
|---|---|---|
| CN | 114970867 A | 8/2022 |
| TW | 202147185 A | 12/2021 |

(Continued)

OTHER PUBLICATIONS

Qing-Ling Hou, Han Wang, and Jing Qian; Active robustness against detuning error for Rydberg quantum gates; Phys. Rev. Applied 22, 034054 â Published Sep. 24, 2024 (Year: 2024).*

(Continued)

*Primary Examiner* — Joseph D Torres

(74) *Attorney, Agent, or Firm* — Shackelford, McKinley & Norton, LLP; Robert A. Voigt, Jr.

(57) ABSTRACT

A method, system, and computer program product for empirically identifying a dynamical decoupling sequence for error suppression on a quantum computer. A training quantum circuit, with an equivalent circuit structure to the target quantum circuit, is selected to identify the optimal dynamical decoupling sequence. A population of dynamical decoupling sequences represented as sequences in a genetic algorithm is generated. Offsprings of a selected set of sequences ("parents") from the population are then generated via reproduction and mutation forming candidate dynamical decoupling sequences, which refer to those dynamical decoupling sequences that may be selected to be used as a "parent" in a subsequent iteration for generating offsprings or selected as the dynamical decoupling sequence to run on the target quantum circuit. One or more dynamical decoupling sequences are selected from the candidate dynamical decoupling sequences based on their fitness with the objective function.

20 Claims, 9 Drawing Sheets

(56)            References Cited

U.S. PATENT DOCUMENTS

| | | | |
|---|---|---|---|
| 2006/0123363 A1* | 6/2006 | Williams | G06N 10/20 |
| | | | 977/839 |
| 2018/0276555 A1 | 9/2018 | Weichenberger | |
| 2022/0114313 A1* | 4/2022 | Zhang | G06N 10/80 |
| 2023/0334358 A1* | 10/2023 | Naveh | G06N 10/70 |

FOREIGN PATENT DOCUMENTS

| | | |
|---|---|---|
| TW | 202531059 A | 8/2025 |
| WO | 2023168480 A1 | 9/2023 |
| WO | 2025/140921 A1 | 7/2025 |

OTHER PUBLICATIONS

Moritz et al., "Using Recurrent Neural Networks to Optimize Dynamical Decoupling for Quantum Memory," arXiv:1604.00279v2, Sep. 17, 2016, pp. 18.

Das et al., "ADAPT: Mitigating Idling Errors in Qubits via Adaptive Dynamical Decoupling," arXiv:2109.05309v1, Sep. 11, 2021, pp. 1-13.

Ezzell et al., "Dynamical Decoupling for Superconducting Qubits: A Performance Survey,"arXiv:2207.03670v2, May 2, 2023, pp. 1-38.

Genov et al., "Arbitrarily Accurate Pulse Sequences for Robust Dynamical Decoupling," Physical Review Letters, vol. 118, 2017, pp. 1-5.

Mundada et al., "Experimental Benchmarking of an Automated Deterministic Error Suppression Workflow for Quantum Algorithms," arXiv:2209.06864v2, May 3, 2023, pp. 1-20.

Proctor, "Scalabe Randomized Benchmarking of Quantum Computers Using Mirror Circuits," arXiv:2112.09853v2, Oct. 10, 2022, pp. 1-8.

Quiroz et al., "Optimized Dynamical Decoupling via Genetic Algorithms," arXiv:1210.5538v2, Aug. 7, 2013, pp. 1-27.

Ravi et al., "VAQEM: A Variational Approach to Quantum Error Mitigation," arXiv:2112.05821v1, Dec. 10, 2021. pp. 1-15.

Mola et al., "Robus Dynamical Decoupling with Bounded Controls," arXiv:quant-ph/0208056v1, Aug. 9, 2002, pp. 1-4.

Zhou et al., "Quantum Crosstalk Robust Quantum Control," arXiv:2208.05978v2, Nov. 20, 2022, pp. 1-17.

Devra et al., "Efficient experimental design of high-fidelity three-qubit quantum gates via genetic programming", vol. 17, article No. 67, (2018), Feb. 10, 2018, 24 pages.

International Searching Authority, "Notification of Transmittal of the International Search Report and the Written Opinion of the International Searching Authority, or Declaration," Patent Cooperation Treaty, Apr. 1, 2025, 10 pages, International Application No. PCT/EP2024/087275.

White et al., "Unifying non-Markovian characterisation with an efficient and self-consistent framework", arXiv:2312.08454, Dec. 13, 2023, 41 pages.

* cited by examiner

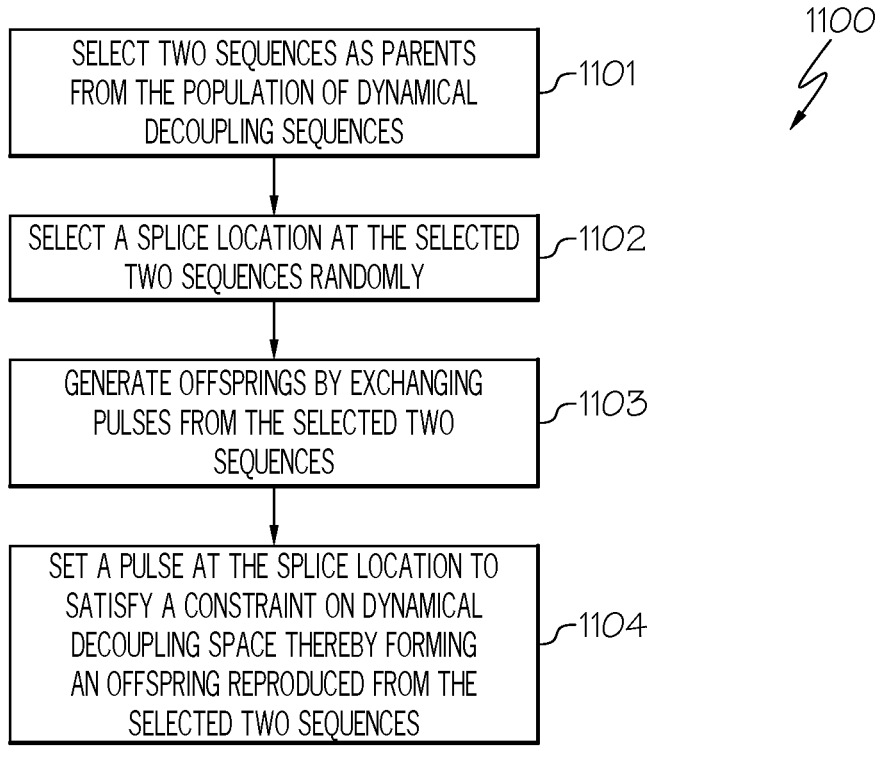

1100

1101 — SELECT TWO SEQUENCES AS PARENTS FROM THE POPULATION OF DYNAMICAL DECOUPLING SEQUENCES

1102 — SELECT A SPLICE LOCATION AT THE SELECTED TWO SEQUENCES RANDOMLY

1103 — GENERATE OFFSPRINGS BY EXCHANGING PULSES FROM THE SELECTED TWO SEQUENCES

1104 — SET A PULSE AT THE SPLICE LOCATION TO SATISFY A CONSTRAINT ON DYNAMICAL DECOUPLING SPACE THEREBY FORMING AN OFFSPRING REPRODUCED FROM THE SELECTED TWO SEQUENCES

FIG. 11

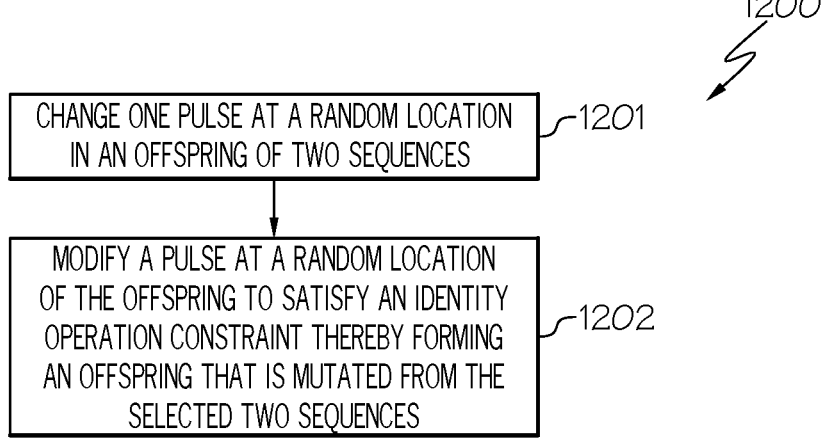

1200

1201 — CHANGE ONE PULSE AT A RANDOM LOCATION IN AN OFFSPRING OF TWO SEQUENCES

1202 — MODIFY A PULSE AT A RANDOM LOCATION OF THE OFFSPRING TO SATISFY AN IDENTITY OPERATION CONSTRAINT THEREBY FORMING AN OFFSPRING THAT IS MUTATED FROM THE SELECTED TWO SEQUENCES

FIG. 12

IDENTIFYING A DYNAMICAL DECOUPLING SEQUENCE FOR ERROR SUPPRESSION OF QUANTUM COMPUTATIONS USING A GENETIC ALGORITHM

TECHNICAL FIELD

The present disclosure relates generally to error suppression strategies, and more particularly to identifying a dynamical decoupling sequence for error suppression of quantum computations using a genetic algorithm.

BACKGROUND

Quantum computing is a rapidly-emerging technology that harnesses the laws of quantum mechanics to solve problems too complex for classical computers. A quantum computer is a computer that exploits quantum mechanical phenomena. At small scales, physical matter exhibits properties of superposition and entanglement, and quantum computing leverages this behavior using specialized hardware that supports the preparation and manipulation of quantum states. Classical physics cannot explain the operation of these quantum devices, and a scalable quantum computer could perform some calculations exponentially faster than any modern "classical" computer.

Quantum hardware, however, is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes.

Various error suppression techniques have been developed to attempt to suppress errors, such as from quantum decoherence. Such error suppression techniques attempt to reduce the likelihood of hardware error while quantum bits are being manipulated or used for memory storage. It uses the physics and techniques of the field of quantum control in order to build resilience against error into the operation of quantum hardware.

Overall there are many strategies to implement error suppression for the different types of operations and tasks undertaken in quantum computers. By protecting all the operations in a quantum algorithm from error, these strategies can push hardware to its limits, closing the gap between the actual algorithmic performance achieved and the theoretical limits imposed by hardware.

One type of error suppression strategy is using dynamical decoupling. Dynamical decoupling is an open-loop quantum control technique employed in quantum computing to suppress quantum decoherence by taking advantage of rapid, time-dependent control modulation. In particular, dynamical decoupling may be used to remove non-Markovian and cross-talk errors during quantum computations. In its simplest form, dynamical decoupling is implemented by periodic sequences of near-instantaneous control pulses, whose net effect is to approximately average the unwanted system-environment coupling to zero. Different schemes exist for designing dynamical decoupling protocols that use realistic bounded-strength control pulses, as well as for achieving high-order error suppression, and for making dynamical decoupling compatible with quantum gates.

However, such schemes require that the quantum device and the quantum circuit under consideration match the noise and imperfection criteria that the theoretically motivated sequences are effective against. The difficulty in finding the appropriate dynamical decoupling sequence for a task and a device is further compounded by the complex and dynamic nature of quantum hardware. That is, the user of the quantum device might not be equipped to comprehensively capture the device's shortcomings let alone find a dynamical decoupling sequence well-suited for the task.

Hence, there is not currently a means for empirically identifying effective dynamical decoupling sequences for error suppression on a quantum computer.

SUMMARY

In one embodiment of the present disclosure, a method for identifying dynamical decoupling sequences for error suppression on a quantum computer comprises generating a population of dynamical decoupling sequences represented as sequences in a genetic algorithm. The method further comprises generating offsprings of the sequences from reproduction and mutation forming candidate dynamical decoupling sequences. The method additionally comprises selecting a dynamical decoupling sequence from the candidate dynamical decoupling sequences based on its fitness with an objective function.

Additionally, in one embodiment of the present disclosure, the dynamical decoupling sequences comprise pulses applied at intervals, where each of the dynamical decoupling sequences in each of the idle gaps in a scheduled quantum circuit multiplies to I (identity operator).

Furthermore, in one embodiment of the present disclosure, the method additionally comprises superimposing the candidate dynamical decoupling sequences on the scheduled quantum circuit to run the candidate dynamical decoupling sequences on the scheduled quantum circuit, where the candidate dynamical decoupling sequences are evaluated for their fitness with the objective function.

Additionally, in one embodiment of the present disclosure, the method further comprises selecting a plurality of dynamical decoupling sequences of the candidate dynamical decoupling sequences based on their fitness with the objective function, where the selected dynamical decoupling sequences are used as a second set of sequences to be used to generate offsprings.

Furthermore, in one embodiment of the present disclosure, the scheduled quantum circuit corresponds to a training quantum circuit with a same circuit structure as a target quantum circuit.

Additionally, in one embodiment of the present disclosure, the training quantum circuit is obtained from the target quantum circuit by cliffordizing and/or mirroring.

Furthermore, in one embodiment of the present disclosure, each qubit of the training quantum circuit is represented in a graph as a vertex designated with a particular color, wherein colors are chosen in the graph such that adjacent vertices do not share a same color.

Additionally, in one embodiment of the present disclosure, the method further comprises running the selected dynamical decoupling sequence on a target quantum circuit.

Furthermore, in one embodiment of the present disclosure, the method additionally comprises selecting two sequences as parents from the population of dynamical decoupling sequences. The method further comprises selecting a splice location at the selected two sequences randomly. Furthermore, the method comprises generating offsprings by exchanging pulses from the selected two sequences. Additionally, the method comprises setting a pulse at the splice location to satisfy a constraint on dynamical decoupling space thereby forming an offspring reproduced from the selected two sequences.

Additionally, in one embodiment of the present disclosure, the method further comprises changing one pulse at a random location in an offspring of two sequences. The method additionally comprises modifying a pulse at a random location of the offspring to satisfy an identity operation constraint thereby forming an offspring mutated from the two sequences.

Furthermore, in one embodiment of the present disclosure, a rate of the mutation is dynamically modified.

Other forms of the embodiments of the method described above are in a system and in a computer program product.

Accordingly, embodiments of the present disclosure effectively identify optimal dynamical decoupling sequences for error suppression on a quantum computer.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 11 is a flowchart of a method for generating off-springs from a selected set of parents via reproduction in accordance with an embodiment of the present disclosure; and FIG. 12 is a flowchart of a method for generating off-springs from a selected set of parents and/or offsprings via mutation in accordance with an embodiment of the present disclosure.

DETAILED DESCRIPTION

Figure 1:
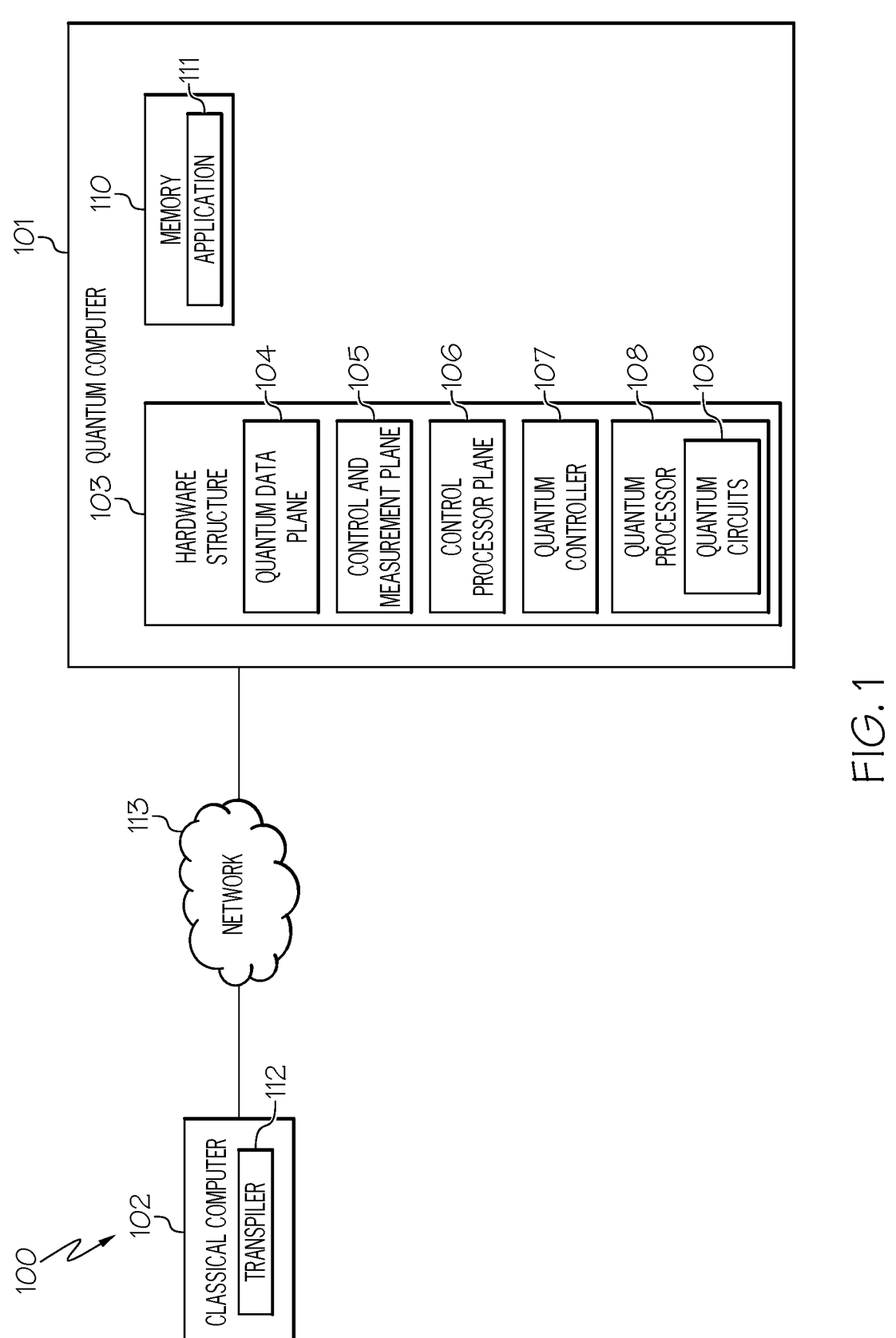
FIG. 1 illustrates a communication system for practicing the principles of the present disclosure in accordance with an embodiment of the present disclosure.

In one embodiment of the present disclosure, a method for identifying dynamical decoupling sequences for error suppression on a quantum computer comprises generating a population of dynamical decoupling sequences represented as sequences in a genetic algorithm. The method further comprises generating offsprings of the sequences from reproduction and mutation forming candidate dynamical decoupling sequences. The method additionally comprises selecting a dynamical decoupling sequence from the candidate dynamical decoupling sequences based on its fitness with an objective function.

In this manner, optimal dynamical decoupling sequences for error suppression on a quantum computer are effectively identified.

Additionally, in one embodiment of the present disclosure, the dynamical decoupling sequences comprise pulses applied at intervals, where each of the dynamical decoupling sequences in each idle gap in a scheduled quantum circuit multiplies to I (identity operator).

In this manner, the dynamical decoupling space may be searched for the optimal dynamical decoupling sequence.

Furthermore, in one embodiment of the present disclosure, the method additionally comprises superimposing the candidate dynamical decoupling sequences on the scheduled quantum circuit to run the candidate dynamical decoupling sequences on the scheduled quantum circuit, where the candidate dynamical decoupling sequences are evaluated for their fitness with the objective function.

In this manner, the dynamical decoupling space may be searched for the optimal dynamical decoupling sequence.

Additionally, in one embodiment of the present disclosure, the method further comprises selecting a plurality of dynamical decoupling sequences of the candidate dynamical decoupling sequences based on their fitness with the objective function, where the selected dynamical decoupling sequences are used as a second set of sequences to be used to generate offsprings.

In this manner, the genetic algorithm may be implemented in multiple iterations thereby enabling the identification of the most optimal dynamical decoupling sequence.

Furthermore, in one embodiment of the present disclosure, the scheduled quantum circuit corresponds to a training quantum circuit with a same circuit structure as a target quantum circuit.

In this manner, the genetic algorithm does not need to be run on the target quantum circuit.

Additionally, in one embodiment of the present disclosure, the training quantum circuit is obtained from the target quantum circuit by cliffordizing and/or mirroring.

In this manner, the training quantum circuit effectively represents the target quantum circuit. Furthermore, by utilizing a training quantum circuit, its outcome can be easily calculated/simulated even when the target quantum circuit is not. As a result, the process of the present disclosure is able to be utilized on arbitrary target quantum circuits.

Furthermore, in one embodiment of the present disclosure, each qubit of the training quantum circuit is represented in a graph as a vertex designated with a particular color, wherein colors are chosen in the graph such that adjacent vertices do not share a same color.

In this manner, the fitness of each individual (a dynamical decoupling sequence for the quantum circuit) is evaluated by applying its sequences on the training quantum circuit according to the qubit color.

Additionally in one embodiment of the present disclosure, the method further comprises running the selected dynamical decoupling sequence on a target quantum circuit.

In this manner, the optimal dynamical decoupling sequence may be applied to the target quantum circuit.

Furthermore, in one embodiment of the present disclosure, the method additionally comprises selecting two sequences as parents from the population of dynamical decoupling sequences. The method further comprises selecting a splice location at the selected two sequences randomly. Furthermore, the method comprises generating offsprings by exchanging pulses from the selected two sequences. Additionally, the method comprises setting a pulse at the splice location to satisfy a constraint on dynamical decoupling space thereby forming an offspring reproduced from the selected two sequences.

In this manner, offsprings from the population are generated via reproduction.

Additionally, in one embodiment of the present disclosure, the method further comprises changing one pulse at a random location in an offspring of two sequences. The method additionally comprises modifying a pulse at a random location of the offspring to satisfy an identity operation constraint thereby forming an offspring mutated from the two sequences.

In this manner, offsprings from the population are generated via mutation.

Furthermore, in one embodiment of the present disclosure, a rate of the mutation is dynamically modified.

In this manner, optimal dynamical decoupling sequences for error suppression on a quantum computer are effectively identified by preventing the population from being trapped in a local maxima thereby enabling the convergence to a high fitness population.

Other forms of the embodiments of the method described above are in a system and in a computer program product.

As stated above, quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes.

Various error suppression techniques have been developed to attempt to suppress errors, such as from quantum decoherence. Such error suppression techniques attempt to reduce the likelihood of hardware error while quantum bits are being manipulated or used for memory storage. It uses the physics and techniques of the field of quantum control in order to build resilience against error into the operation of quantum hardware.

Overall there are many strategies to implement error suppression for the different types of operations and tasks undertaken in quantum computers. By protecting all the operations in a quantum algorithm from error, these strategies can push hardware to its limits, closing the gap between the actual algorithmic performance achieved and the theoretical limits imposed by hardware.

One type of error suppression strategy is using dynamical decoupling. Dynamical decoupling is an open-loop quantum control technique employed in quantum computing to suppress quantum decoherence by taking advantage of rapid, time-dependent control modulation. In particular, dynamical decoupling may be used to remove non-Markovian and cross-talk errors during quantum computations. In its simplest form, dynamical decoupling is implemented by periodic sequences of near-instantaneous control pulses, whose net effect is to approximately average the unwanted system-environment coupling to zero. Different schemes exist for designing dynamical decoupling protocols that use realistic bounded-strength control pulses, as well as for achieving high-order error suppression, and for making dynamical decoupling compatible with quantum gates.

However, such schemes require that the quantum device and the quantum circuit under consideration match the noise and imperfection criteria that the theoretically motivated sequences are effective against. The difficulty in finding the appropriate dynamical decoupling sequence for a task and a device is further compounded by the complex and dynamic nature of quantum hardware. That is, the user of the quantum device might not be equipped to comprehensively capture the device's shortcomings let alone find a dynamical decoupling sequence well-suited for the task.

Hence, there is not currently a means for empirically identifying effective dynamical decoupling sequences for error suppression on a quantum computer.

The embodiments of the present disclosure provide the means for identifying dynamical decoupling sequences for error suppression on a quantum computer by employing a genetic algorithm to search the space of candidate error suppression strategies (possible dynamical decoupling sequences) for the optimal candidate error suppression strategy. In one embodiment, a population of dynamical decoupling sequencies represented as sequences in a genetic algorithm is generated. The elements (genes) of such sequences form the pulses in the dynamical decoupling sequence. Offsprings of such sequences may then be generated, such as from reproduction and mutations, forming candidate dynamical decoupling sequences. A "candidate dynamical decoupling sequence," as used herein, refers to those dynamical decoupling sequences that may be selected to either be used as a "parent" in a subsequent iteration for generating offsprings or selected as the dynamical decoupling sequence to be run on the target quantum circuit. After constructing a scheduled quantum circuit, which may correspond to a training quantum circuit that has the same circuit structure as the target quantum circuit (circuit whose performance is to be maximized), the idle gaps in the scheduled quantum circuit are identified where the candidate dynamical decoupling sequences can be inserted. The candidate dynamical decoupling sequencies may then be superimposed in the scheduled quantum circuit at the identified idle gaps. After executing the scheduled quantum circuit on the quantum computer, the candidate dynamical decoupling sequences are evaluated for their fitness with an objective function. A dynamical decoupling sequence may then be selected from the candidate dynamical decoupling sequences based on its fitness with an objective function, which is then run on the target quantum circuit. By employing a genetic algorithm to search the space of candidate error suppression strategies (possible dynamical decoupling sequences) for the optimal candidate error suppression strategy, the optimal error suppression strategy (dynamical decoupling sequence) is selected to run on the target quantum circuit thereby maximizing the performance of the target quantum circuit. These and other features will be discussed in further detail below.

In some embodiments of the present disclosure, the present disclosure comprises a method, system, and computer program product for identifying a dynamical decoupling sequence for error suppression on a quantum computer. In one embodiment of the present disclosure, a population of dynamical decoupling sequences represented as sequences in a genetic algorithm is generated. A dynamical decoupling sequence during an idle gap (locations where no operations are being performed) in the quantum circuit is comprised of pulses $\{P_j\}$ applied at intervals $\{\tau_j\}$ with the goal of cancelling the system-environment interactions. The dynamical decoupling sequence for a quantum circuit, as used herein, is where the dynamical decoupling sequence for each idle gap is applied individually and based on the color coding for the corresponding qubit. Color coding, as used herein, refers to associating each qubit with a designated color. A genetic algorithm, as used herein, refers to a heuristic approach to optimize an objective function on a high-dimensional space whose members can be represented as a dynamical decoupling sequence for a quantum circuit. A sequence, as used herein, is one of the solutions in the population. Offsprings of a selected set of sequences ("parents") from the population are then generated via reproduction and mutation forming candidate dynamical decoupling sequences. A "candidate dynamical decoupling sequence," as used herein, refers to those dynamical decoupling sequences that may be selected to either be used as a "parent" in a subsequent iteration for generating offsprings or selected as the dynamical decoupling sequence to be run on the target quantum circuit. The target quantum circuit, as used herein, refers to the quantum circuit whose performance is to be maximized. One or more dynamical decoupling sequences may be selected from the candidate dynamical decoupling sequences based on their fitness with the objective function. In one embodiment, the best dynamical decoupling sequence is selected from the candidate dynamical decoupling sequences based on its fitness with the objective function. Upon selecting the best dynamical decoupling sequence from the candidate dynamical decoupling sequences, the selected dynamical decoupling sequence is run on the target quantum circuit, which is executed on the quantum computer. Alternatively, dynamical decoupling sequences are selected from the candidate dynamical decoupling sequences based on their fitness with the objective function forming a set of sequences to be used to generate further offsprings in a further iteration of the genetic algorithm. In this manner, the optimal dynamical decoupling sequence for error suppression on a quantum computer is identified.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference, and entanglement, as well as a classical computer 102 in which information is stored in bits that are represented logically by either a 0 (off) or a 1 (on). Examples of classical computer 102 include, but are not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to set up the state of quantum bits in quantum computer 101 and then quantum computer 101 starts the quantum process. Furthermore, in one embodiment, classical computer 102 is configured to identify dynamical decoupling sequences for error suppression on quantum computer 101 as discussed further below.

In one embodiment, a hardware structure 103 of quantum computer 101 includes a quantum data plane 104, a control and measurement plane 105, a control processor plane 106, a quantum controller 107, and a quantum processor 108. While depicted as being located on a single machine, quantum data plane 104, control and measurement plane 105, and control processor plane 106 may be distributed across multiple computing machines, such as in a cloud computing architecture, and communicate with quantum controller 107, which may be located in close proximity to quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state, and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gates, are all reversible. Examples of quantum logic gates include RX (performs $e^{i\theta X/2}$, which corresponds to a rotation of the qubit state around the X-axis by the given angle theta $\theta$ on the Bloch sphere), RY (performs $e^{i\theta Y/2}$, which corresponds to a rotation of the qubit state around the Y-axis by the given angle theta $\theta$ on the Bloch sphere), RXX (performs the operation $e^{(-i\theta X \otimes X/2)}$ on the input qubit), RZZ (takes in one input, an angle theta $\theta$ expressed in radians, and it acts on two qubits), etc. In one embodiment, quantum circuits 109 are written such that the horizontal axis is time, starting at the left-hand side and ending at the right-hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for identifying dynamical decoupling sequences for error suppression on quantum computer 101 as discussed further below in connection with FIGS. 2-8 and 10-12. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses, and algorithms) rewrites a given input circuit to match the topology of a specific quantum device and/or to optimize the quantum circuit for execution. In one embodiment, transpiler 112 converts a trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters, and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to set up the state of quantum bits in quantum computer 101, may be connected to quantum computer 101 via network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to identify dynamical decoupling sequences for error suppression on quantum computer 101 as discussed further below in connection with FIGS. 2-8 and 10-12. A description of the software components of classical computer 102 is provided below in connection with FIG. 2 and a description of the hardware configuration of classical computer 102 is provided further below in connection with FIG. 9.

System 100 is not to be limited in scope to any one particular network architecture. System 100 may include any number of quantum computers 101, classical computers 102, and networks 113.

A discussion regarding the software components used by classical computer 102 for identifying dynamical decoupling sequences for error suppression on quantum computer 101 is provided below in connection with FIG. 2.

Figure 2:
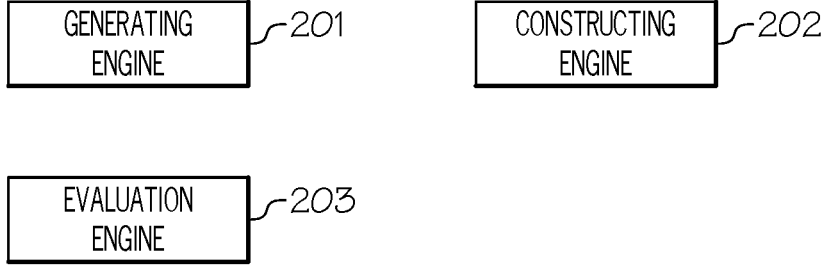
FIG. 2 is a diagram of the software components of the classical computer for identifying dynamical decoupling sequences for error suppression on a quantum computer in accordance with an embodiment of the present disclosure.

FIG. 2 is a diagram of the software components of classical computer 102 (FIG. 1) for identifying dynamical decoupling sequences for error suppression on quantum computer 101 in accordance with an embodiment of the present disclosure.

Referring to FIG. 2, in conjunction with FIG. 1, classical computer 102 includes a generating engine 201 configured to generate a population of dynamical decoupling sequences represented as sequences in a genetic algorithm. A dynamical decoupling sequence during an idle gap (locations where no operations are being performed) in the quantum circuit is comprised of pulses $\{P_j\}$ applied at intervals $\{\tau_j\}$ with the goal of cancelling the system-environment interactions. The dynamical decoupling sequence for a quantum circuit, as used herein, is where the dynamical decoupling sequence for each idle gap is applied individually and based on the color coding for the corresponding qubit. Color coding, as used herein, refers to associating each qubit with a designated color. A genetic algorithm, as used herein, refers to a heuristic approach to optimize an objective function on a high-dimensional space whose members can be represented as a dynamical decoupling sequence for a quantum circuit. A sequence, as used herein, is one of the solutions in the population.

In one embodiment, generating engine 201 selects a decoupling group, for instance {I, X, Y, Z}, the elements of which form the pulse in the dynamical decoupling sequence. In one embodiment, the dynamical decoupling sequences include pulses applied at intervals, where each pulse corresponds to a gene of a sequence. The genes of a sequence correspond to the elements of the sequence. For example, if the dynamical decoupling sequence was represented by the sequence {I, X, Y, Z, I', X', Y', Z'}, then such elements, such as "X," "Y," "Z," etc. correspond to the genes of the sequence.

An "individual," as used herein, refers to a dynamical decoupling sequence for the quantum circuit as well a set of dynamical decoupling sequences on each idle gap, applied color-wise to the full quantum circuit. For example, if there are two colors, then an individual may correspond to {XYXY, YZYZ} based on the elements {X, Y, Z}.

In one embodiment, each dynamical decoupling sequence in each idle gap multiplies to I (identity operator).

In one embodiment, generating engine 201 of classical computer 102 selects a training quantum circuit to be scheduled to be evaluated.

In one embodiment, generating engine 201 obtains training quantum circuits that have the same circuit structure as the target quantum circuit. Training quantum circuits, as used herein, refer to quantum circuits that the genetic algorithm will optimize. Such quantum circuits may have the same circuit structure as the target quantum circuits, but the individual gates will be different. Target quantum circuits, as used herein, refer to the quantum circuits that are to be maximized.

In one embodiment, such training quantum circuits are obtained from the target quantum circuit via cliffordizing and/or mirroring. Cliffordizing, as used herein, refers to changing the non-Clifford gates to Clifford gates while preserving the structure of the quantum circuit. Mirroring, as used herein, refers to creating a mirrored version of the target quantum circuit. In one embodiment, a mirrored circuit is a circuit whose second half is the first half inverted in gate order and with gates replaced by their inverses, such that the entire circuit is equivalent to the identity.

In one embodiment, generating engine 201 selects one of the obtained training quantum circuits to be scheduled to be evaluated as well as selects a suitable objective function on the selected training quantum circuit for the algorithm of the present disclosure (method 1000) to optimize in order to identify the best dynamical decoupling sequence for error suppression on a quantum computer.

In one embodiment, generating engine 201 generates a population that consists of an n parent population, where n is a positive integer number. A "parent," as used herein, refers to a sequence that is used to generate offsprings as discussed further below.

In one embodiment, generating engine 201 generates 2Q offsprings from Q parents, where Q is a positive integer number.

In one embodiment, the starting population of dynamical decoupling sequences represented as sequences in a genetic algorithm has uniformity. In one embodiment, in the starting population, every group element (every element of the sequence) occurs at every position in some individual sequence. For example, the population size of 8 with a length of 8 elements {I, X, Y, Z} would have each group element appear twice in each position among all the sequences. For example, the following 8 sequences with a length of 8 may be generated with the elements {I, X, Y, Z}: (1) {I, X, Y, Z, I, X, Y, Z}; (2) {X, Y, Z, I, X, Y, Z, I}; (3) {Y, Z, I, X, Y, Z, I, X}; (4) {Z, I, X, Y, Z, I, X, Y}; (5) {I, Y, X, Z, I, Y, X, Z}; (6) {Y, X, Z, I, Y, X, Z, I}; (7) {X, Z, I, Y, X, Z, I, Y}; and (8) {Z, I, X, Y, Z, I, X, Y}. By utilizing the strategy of uniformity for the initial population, directional bias towards any individual dynamical decoupling sequence is minimized. That is, the evolution that occurs during the running of the genetic algorithm, as discussed below, is due to increasing fitness (how close a given design solution is to achieving the set aims) as opposed to initial luck.

In one embodiment, the starting population of dynamical decoupling sequences involves establishing a group of decoupling pulses, sequence lengths for the dynamical decoupling sequences in each idle gap, and subsets of backend qubits over which the space of all fixed length dynamical decoupling sequences constructed from the pulses in the decoupling group is searched.

In one embodiment, generating engine 201 generates an initial population of individuals, where every individual has a dynamical decoupling sequence to be padded to qubits of a given color (discussed further below) for every color. In one embodiment, generating engine 201 constructs such an initial population by randomly generating group elements or with additional restrictions, such as imposing non-directionality in the offspring generation.

Furthermore, in one embodiment, generating engine 201 generates offsprings of a selected set of sequences ("parents") from the population via reproduction and mutation forming candidate dynamical decoupling sequences. A "candidate dynamical decoupling sequence," as used herein, refers to a dynamical decoupling sequence that may be selected to either be used as a "parent" in a subsequent iteration for generating offsprings or may be selected as the dynamical decoupling sequence to be run on the target quantum circuit. The target quantum circuit, as used herein, refers to the quantum circuit whose performance is to be maximized.

A discussion regarding generating engine 201 generating offsprings of a selected set of sequences ("parents") from the population via reproduction is discussed below.

Figure 3:
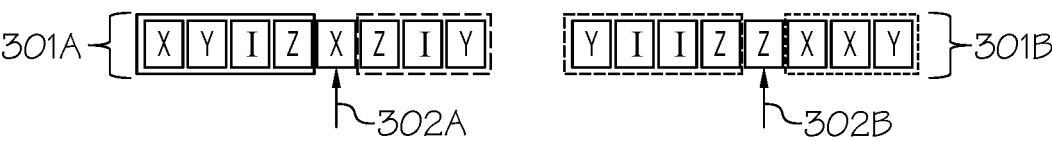
FIG. 3 illustrates generating offsprings from the population via reproduction in accordance with an embodiment of the present disclosure.
Figure 3:
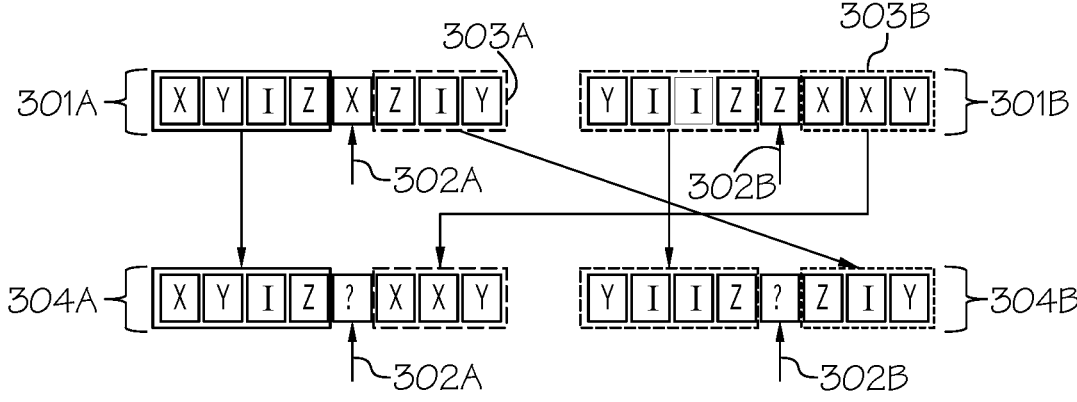

In one embodiment, generating engine 201 selects two parents from the population of dynamical decoupling sequences represented as sequences as illustrated in FIG. 3. In one embodiment, generating engine 201 selects such two parents with better fitness from the population of dynamical decoupling sequences represented as sequences. In one embodiment, generating engine 201 selects such two parents randomly from the population of dynamical decoupling sequences represented as sequences. In one embodiment, generating engine 201 selects such two parents from the population of dynamical decoupling sequences represented as sequences which have not previously been selected.

Referring now to FIG. 3, FIG. 3 illustrates generating offsprings from the population via reproduction in accordance with an embodiment of the present disclosure.

As shown in FIG. 3, parents 301A, 301B were selected to create offsprings, where parent 301A corresponds to the sequence with the elements {X, Y, I, Z, X, Z, I, Y} and where parent 301B corresponds to the sequence with the elements {Y, I, I, Z, Z, X, X, Y}. Parents 301A, 301B may collectively or individually be referred to as parents 301 or parent 301, respectively.

In one embodiment, generating engine 201 selects a random splice location from the parents 301A, 301B (i.e., from the selected sequences 301A, 301B). "Splice," as used herein, refers to designating a position of the sequence at which a pulse (a group of genes), such as pulses 303A, 303B of parents 301A, 301B, respectively, will be exchanged among the parents. For example, as shown in FIG. 3, splice locations 302A, 302B were selected from parents 301A, 301B, respectively. The pulse (e.g., pulses 303A, 303B) at the splice location (e.g., splice locations 302A, 302B) is used to satisfy the constraint that dynamical decoupling sequences need to add to the identity operation. Splice locations 302A, 302B may collectively or individually be referred to as splice locations 302 or splice location 302, respectively. Pulses 303A, 303B may collectively or individually be referred to as pulses 303 or pulse 303, respectively.

In one embodiment, generating engine 201 generates offsprings 304A, 304B by exchanging pulses 303B, 303A, respectively, as shown in FIG. 3. Offsprings 304A, 304B may collectively or individually be referred to as offsprings 304 or offspring 304, respectively.

A pulse at the splice location 302A, 302B of offsprings 304A, 304B, respectively, may then be set by generating engine 201 to satisfy a constraint on the dynamical decoupling space thereby forming an offspring reproduced from the selected two sequences. For example, the pulse of Y may be set at splice location 302A.

Alternatively, offsprings, such as offsprings 304, are generated from the selected set of sequences ("parents") via mutation as discussed below in connection with FIG. 4.

Figure 4:
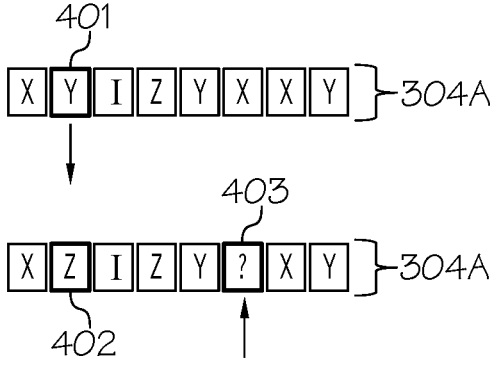
FIG. 4 illustrates generating offsprings from the population via mutation in accordance with an embodiment of the present disclosure.
Figure 4:
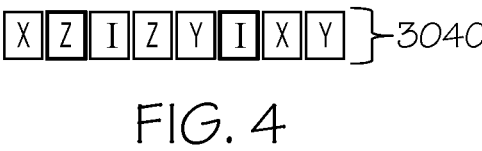

FIG. 4 illustrates generating offsprings from the population via mutation in accordance with an embodiment of the present disclosure.

As shown in FIG. 4, a pulse at a random location (e.g., location 401) in offspring 304 (e.g., offspring 304A) is changed by generating engine 201, such as from Y (see location 401) to Z (see location 402). Alternatively, such a pulse may be changed at a random location in parent 301. Furthermore, in one embodiment, pulses at multiple locations in offspring 304 may be changed.

In one embodiment, generating engine 201 modifies a pulse at a second random location (see location 403) of the offspring 304 (e.g., offspring 304A) to satisfy the identity operation constraint (multiplication to I) thereby forming an offspring 304C that is mutated from the selected two sequences (parents 301A, 301B).

In one embodiment, the mutation rate can be varied according to the current rate of convergence criteria, the current fitness of the population, or some other criteria. By having a dynamic mutation rate, the population is prevented from being trapped in a local maxima and converges to a high fitness population.

In one embodiment, in order to achieve genetic algorithm success, the probability that any offspring 304 will mutate can be dynamically changed according to the population. For example, if one dynamical decoupling sequence is much better than the rest of the population, then such genes may be desired to spread. As a result, it may be desirable to decrease mutations. In contrast, if the entire population is performing similarly, then it may be desirable to identify a sequence that performs better. As a result, it may be desirable to increase mutations.

In one embodiment, generating engine 201 utilizes functions F(P) for determining if population P should mutate. Example functions F(P) include the range function $F=P_{max}-P_{min}$, the relative range function $F=(P_{max}-P_{min})/P_{min}$, or the standard deviation function $F=\sigma_p$.

In one embodiment, generating engine 201 utilizes various mutation methods (e.g., if F(P) is less than or greater than a value, then mutation is accordingly adjusted, such as increased or decreased), such as the probability that a dynamical decoupling sequence undergoes a single mutation, a number of mutation sites per dynamical decoupling sequence, or the probability of introducing new random individuals to the population.

Returning to FIG. 2, in conjunction with FIGS. 1 and 3-4, classical computer 102 further includes constructing engine 202 configured to search the product space of dynamical decoupling sequences on adjacent qubits to mitigate crosstalk.

In one embodiment, constructing engine 202 constructs the scheduled quantum circuit corresponding to the selected training quantum circuit.

As stated above, in one embodiment, the scheduled quantum circuit corresponds to the selected training quantum circuit with the same circuit structure as the target quantum circuit. By constructing a scheduled quantum circuit, constructing engine 202 is able to search the product space of dynamical decoupling sequences on adjacent qubits to mitigate crosstalk.

In one embodiment, such quantum circuits are k-colored, such that each qubit represents a vertex and each edge represents a two-qubit gate. For example, each qubit and two-qubit gate may be represented in a graph of vertices and edges designated with a particular color as illustrated in FIG. 5.

Figure 5:
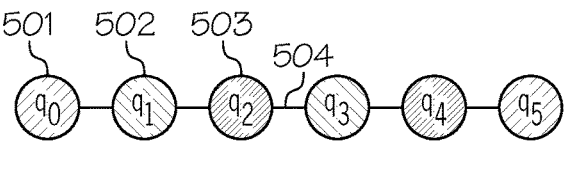
FIG. 5 illustrates color coding each qubit and two-qubit gate in accordance with an embodiment of the present disclosure.

FIG. 5 illustrates color coding each qubit and two-qubit gate (designated with different shades) in accordance with an embodiment of the present disclosure.

Referring to FIG. 5, each qubit and two-qubit gate is represented in a graph by a vertex and edge, respectively, where each qubit and two-qubit gate is color coded (represented as a different shade). For example, qubits $q_0$ and $q_5$ are represented by color 501 (shown as a shade in FIG. 5), qubits $q_1$ and $q_3$ are represented by color 502 (shown as a shade in FIG. 5), qubits $q_2$ and $q_4$ are represented by color 503 (shown as a shade in FIG. 5), and two-qubit gates are represented by color 504 (shown as a shade in FIG. 5). In one embodiment, colors are chosen in the graph such that adjacent vertices do not share the same color.

The genetic dynamical decoupling search may then be implemented in parallel across each of the colors. As a result, the genetic algorithm can be run directly on the physical qubits thereby optimizing the dynamical decoupling sequences for the device and problem at hand. In this manner, the search of the produce space of dynamical decoupling sequences on adjacent qubits can occur which mitigates crosstalk and effectively includes staggered dynamical decoupling sequences in the search space. It is noted that any number of colors may be utilized corresponding to the number of qubits.

Returning to FIG. 2, in conjunction with FIGS. 1 and 3-5, in one embodiment, constructing engine 202 constructs the scheduled quantum circuit using the scheduler function of Qiskit® to translates a quantum circuit (e.g., training quantum circuit) into a pulse schedule using gate and measurement calibrations. Other software tools that may be used by constructing engine 202 to construct a scheduled quantum circuit (e.g., training quantum circuit) include, but are not limited to, Classiq®, Open QL®, ProjectQ®, etc.

In one embodiment, constructing engine 202 identifies idle gaps in the scheduled quantum circuit where the candidate dynamical decoupling sequences can be inserted. Idle gaps, as used herein, refer to locations where no operations are being performed as illustrated in FIG. 6.

Figure 6:
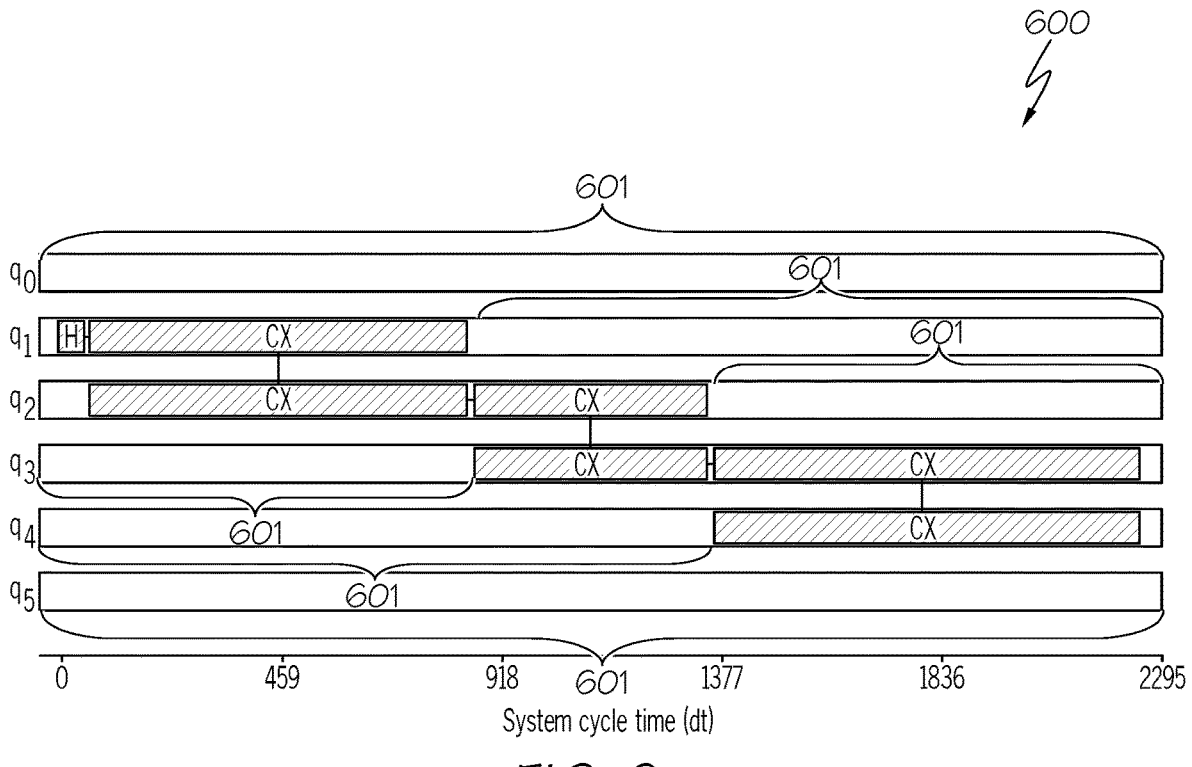
FIG. 6 illustrates identifying idle gaps in the scheduled quantum circuit in accordance with an embodiment of the present disclosure.

FIG. 6 illustrates identifying idle gaps 601 in the scheduled quantum circuit 600 in accordance with an embodiment of the present disclosure.

As illustrated in FIG. 6, such idle gaps 601 correspond to locations where dynamical decoupling sequences can be inserted.

Figure 7:
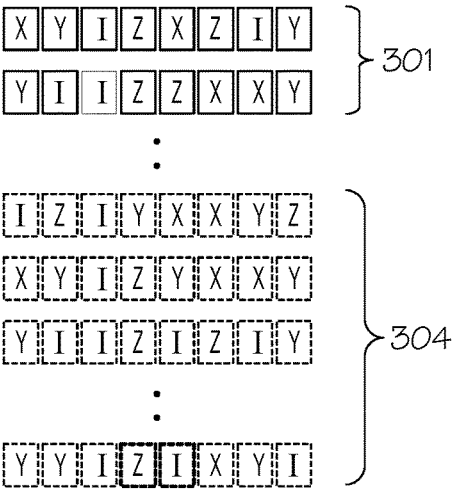
FIG. 7 illustrates superimposing the candidate dynamical decoupling sequences in the scheduled quantum circuit at the identified idle gaps in accordance with an embodiment of the present disclosure.
Figure 7:
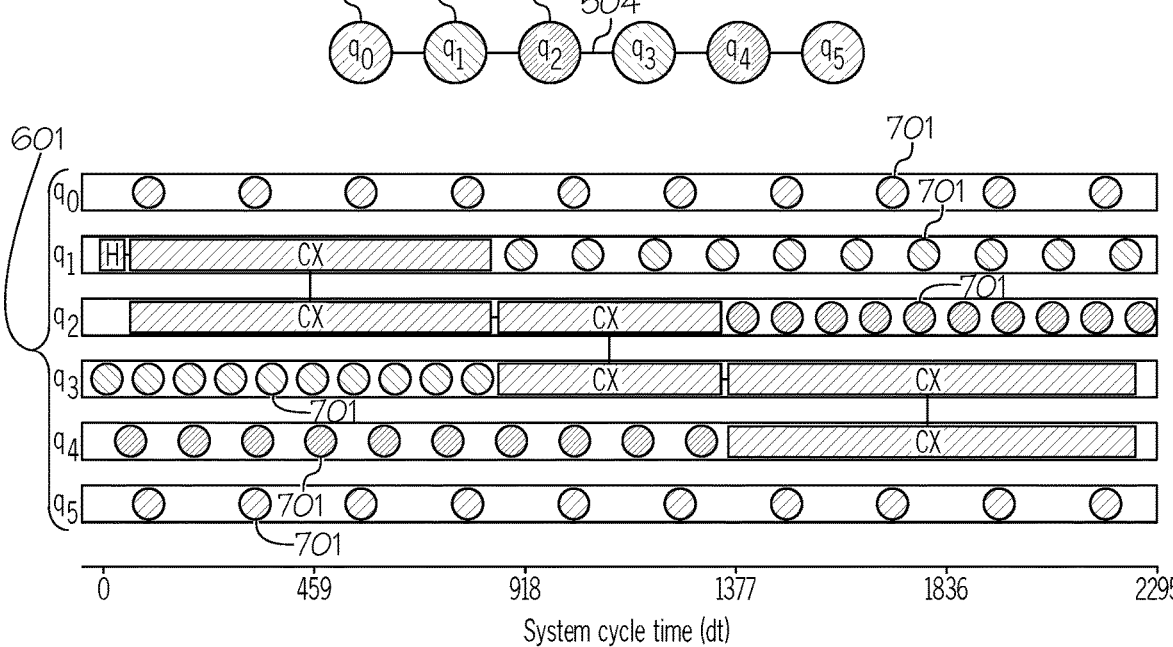

Returning to FIG. 2, in conjunction with FIGS. 1 and 3-6, in one embodiment, constructing engine 202 is configured to superimpose the candidate dynamical decoupling sequences in the scheduled quantum circuit (e.g., scheduled quantum circuit 600) at the identified idle gaps (e.g., idle gaps 601) as illustrated in FIG. 7.

FIG. 7 illustrates superimposing the candidate dynamical decoupling sequences in the scheduled quantum circuit (e.g., scheduled quantum circuit 600) at the identified idle gaps (e.g., idle gaps 601) in accordance with an embodiment of the present disclosure.

As shown in FIG. 7, the candidate dynamical decoupling sequences, such as the offsprings 304 from parents 301 as well as parents 301, are superimposed in scheduled quantum circuit 600 at the identified idle gaps 601 as shown via element 701.

Returning to FIG. 2, in conjunction with FIGS. 1 and 3-7, in one embodiment, classical computer 102 further includes an evaluation engine 203 configured to evaluate the candidate dynamical decoupling sequences (parents 301 and offsprings 304) for their fitness with an objective function. Fitness, as used herein, refers to how close a given design solution is to achieving the set aims, which in this case refers to the objective function. An objective function, as used herein, refers to a real-valued function whose value is to be either minimized or maximized over the set of feasible alternatives. As previously discussed, a genetic algorithm is a heuristic approach to optimize an objective function on a high dimensional space whose members can be represented as "sequences." The objective function discussed above refers to the objective function to be optimized via the genetic algorithm of the present disclosure.

In one embodiment, the objective function measures the performance of the quantum circuit (e.g., training quantum circuit with the superimposed candidate dynamical decoupling sequences) by success probability ($p_{success}$), fidelity ($\langle \psi_{desired}|\rho|\psi_{desired} \rangle$), or the distance from a desired probability distribution ($|\vec{p}_{observed} - \vec{p}_{desired}|$).

In one embodiment, such an evaluation occurs on quantum computer 101. That is, the scheduled quantum circuit with the superimposed candidate dynamical decoupling sequences is executed to run on quantum computer 101. Hence, in one embodiment, classical computer 102 implements a genetic algorithm search on the space of possible dynamical decoupling sequences while quantum computer 101 tests the viability of the dynamical decoupling sequence.

Figure 8:
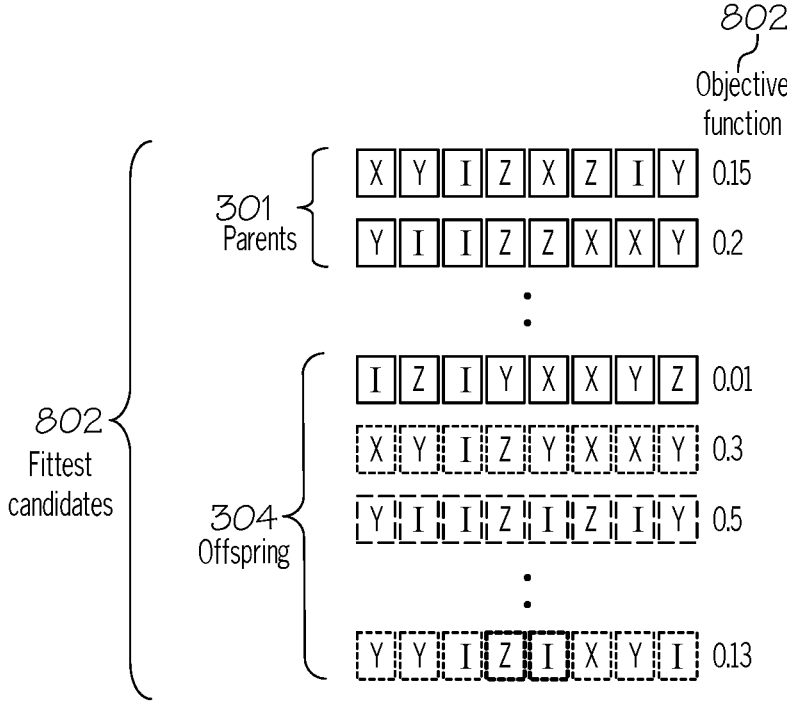
FIG. 8 illustrates evaluating the dynamical decoupling sequences based on their fitness to the objective function in accordance with an embodiment of the present disclosure.

As discussed above, in one embodiment, evaluation engine 203 evaluates the dynamical decoupling sequences based on their fitness to the objective function, which is illustrated in FIG. 8.

FIG. 8 illustrates evaluating the dynamical decoupling sequences based on their fitness to the objective function in accordance with an embodiment of the present disclosure.

Referring to FIG. 8, in one embodiment, evaluation engine 203 selects the best dynamical decoupling sequence from the candidate dynamical decoupling sequences (parents 301 and offsprings 304) based on its fitness with the objective function. As shown in FIG. 8, such fitness may correspond to a value 801 as to how close the dynamical decoupling sequence achieves the objective function. In one embodiment, the higher the value, the closer the dynamical decoupling sequence achieves the objective function and vice-versa. In one embodiment, evaluation engine 203 selects the best dynamical decoupling sequence from the candidate dynamical decoupling sequences based on its fitness with the objective function when its fitness with the objective function exceeds a threshold value, which may be user-designated.

Upon selecting the best dynamical decoupling sequence from the candidate dynamical decoupling sequences based on its fitness with the objective function, the selected dynamical decoupling sequence is run on the target quantum circuit, which is executed on quantum computer 101.

Alternatively, dynamical decoupling sequences from the candidate dynamical decoupling sequences are selected based on their fitness with the objective function forming a set of sequences to be used to generate further offsprings (e.g., offsprings 304). Such selected dynamical decoupling sequences correspond to the fittest candidates 802, which will be used for the parents in the next iteration of selecting offsprings 304. Such fittest candidates 802 may correspond to those parents 301, offsprings 304 with a fitness value 801 that exceeds a threshold value, which may be user-designated. In one embodiment, such fittest candidates 802 may correspond to those parents 301, offsprings 301 with a fitness value 801 that exceeds a first threshold value, which may be user-designated, but less than a second threshold value, which may be user-designated. The second threshold value may correspond to the value that the fitness value 801 needs to exceed in order to complete the iterations of generating offsprings 304, where such a dynamical decoupling sequence that exceeds the second threshold value is designated as the best dynamical decoupling sequence to be selected and run on the target quantum circuit.

Furthermore, FIG. 8 illustrates that the algorithm of the present disclosure runs on a population of individuals to evolve such a population of individuals towards higher-fitness individuals. The fitness of each individual is evaluated by applying its sequences on the training quantum circuit according to the qubit color. As shown in FIG. 8, such parents 301, offsprings 304 are individuals with sequences over multiple colors (illustrated by different shades).

In one embodiment, the technique discussed above in identifying the dynamical decoupling sequence for error suppression on quantum computer 101 can be generalized to cases where the expected output of the target quantum circuit (or family of quantum circuits) and the objective function are unknown or hard to compute.

As a result of empirically searching the space of dynamical decoupling sequences, dynamical decoupling sequences for error suppression on quantum computer 101 are more effectively identified.

In one embodiment, the family of sequences that the genetic algorithm scheme of the present disclosure identified could be analyzed for its robustness to the various error parameters that affect dynamical decoupling performance. Such an analysis could reveal features of the quantum device as dynamical decoupling can be used to infer errors plaguing quantum computer 101. Secondly, a theoretical analysis of the dynamical decoupling sequences may aid in deterministic theoretical schemes to design dynamical decoupling sequences which do not yet exist.

Furthermore, the genetic algorithm scheme of the present disclosure optimizes performance of the quantum circuit when the quantum results are not known a priori and not able to be simulated. As a result, quantum tasks can be optimized for which the classical counterpart is hard or impossible.

Additionally, the genetic algorithm scheme of the present disclosure is scalable to large quantum devices.

Furthermore, comprehensive analysis of the best performing dynamical decoupling sequences can be used to determine the most significant noise sources in a quantum device (e.g., quantum computer 101) by determining the types of errors that the sequences cancel. As a result, an analysis of the dynamical decoupling sequences can be used to identify and permanently remove complex error sources.

A further description of these and other functions is provided below in connection with the discussion of the method for identifying a dynamical decoupling sequence for error suppression on a quantum computer (e.g., quantum computer 101).

Prior to the discussion of the method for identifying a dynamical decoupling sequence for error suppression on a quantum computer, a description of the hardware configuration of classical computer 102 (FIG. 1) is provided below in connection with FIG. 9.

Figure 9:
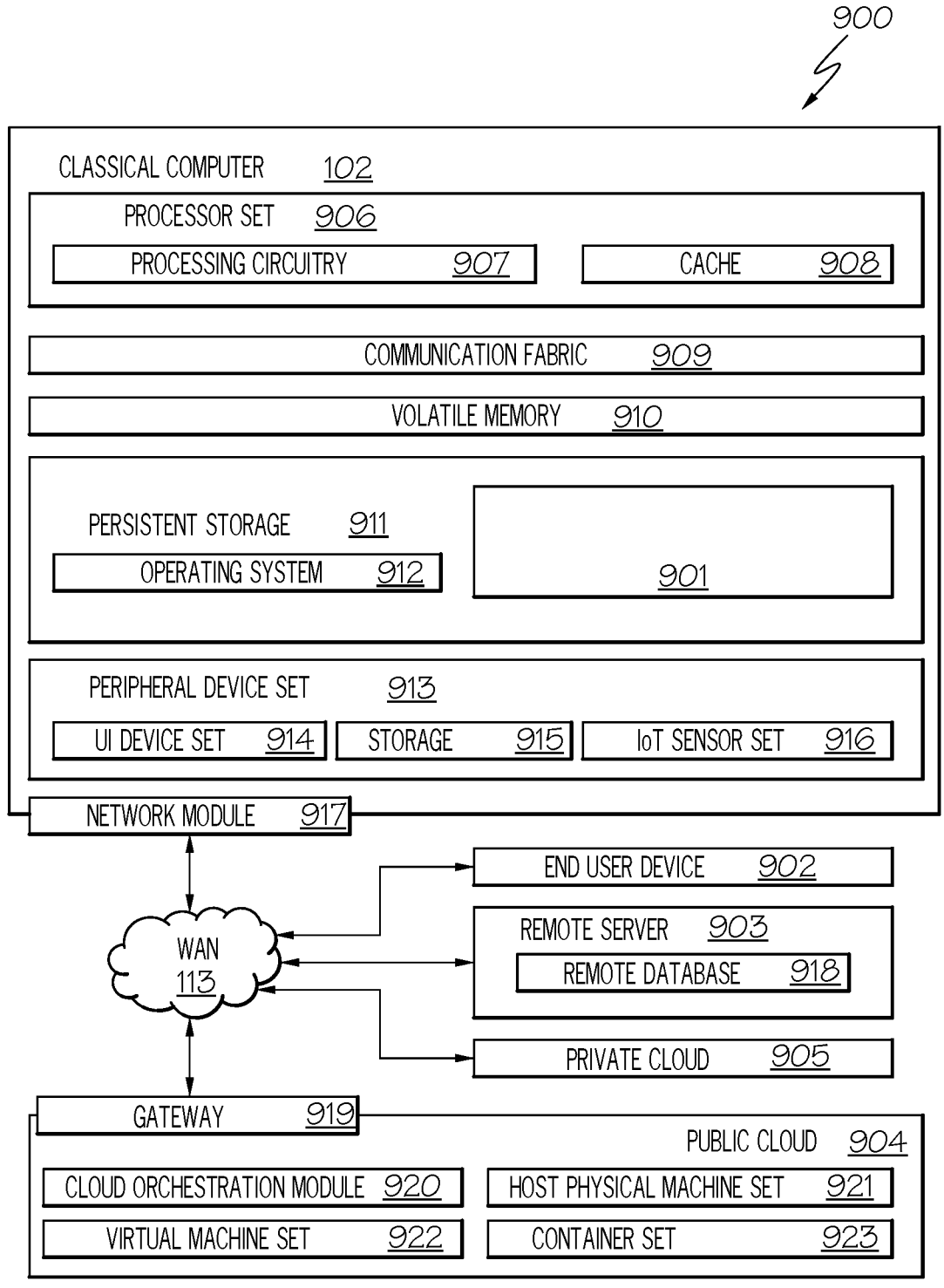
FIG. 9 illustrates an embodiment of the present disclosure of the hardware configuration of the classical computer which is representative of a hardware environment for practicing the present disclosure.

Referring now to FIG. 9, in conjunction with FIG. 1, FIG. 9 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code 901 involved in performing the inventive methods, such as identifying a dynamical decoupling sequence for error suppression on a quantum computer. In addition to block 901, computing environment 900 includes, for example, classical computer 102, network 113, such as a wide area network (WAN), end user device (EUD) 902, remote server 903, public cloud 904, and private cloud 905. In this embodiment, classical computer 102 includes processor set 906 (including processing circuitry 907 and cache 908), communication fabric 909, volatile memory 910, persistent storage 911 (including operating system 912 and block 901, as identified above), peripheral device set 913 (including user interface (UI) device set 914, storage 915, and Internet of Things (IoT) sensor set 916), and network module 917. Remote server 903 includes remote database 918. Public cloud 904 includes gateway 919, cloud orchestration module 920, host physical machine set 921, virtual machine set 922, and container set 923.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 918. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically classical computer 102, to keep the presentation as simple as possible. Classical computer 102 may be located in a cloud, even though it is not shown in a cloud in FIG. 9. On the other hand, classical computer 102 is not required to be in a cloud except to any extent as may be affirmatively indicated.

Processor set 906 includes one, or more, computer processors of any type now known or to be developed in the future. Processing circuitry 907 may be distributed over multiple packages, for example, multiple, coordinated integrated circuit chips. Processing circuitry 907 may implement multiple processor threads and/or multiple processor cores. Cache 908 is memory that is located in the processor chip package(s) and is typically used for data or code that should be available for rapid access by the threads or cores running on processor set 906. Cache memories are typically organized into multiple levels depending upon relative proximity to the processing circuitry. Alternatively, some, or all, of the cache for the processor set may be located "off chip." In some computing environments, processor set 906 may be designed for working with qubits and performing quantum computing.

Computer readable program instructions are typically loaded onto classical computer 102 to cause a series of operational steps to be performed by processor set 906 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 908 and the other storage media discussed below. The program instructions, and associated data, are accessed by processor set 906 to control and direct performance of the inventive methods. In computing environment 900, at least some of the instructions for performing the inventive methods may be stored in block 901 in persistent storage 911.

Communication fabric 909 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 910 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 910 is located in a single package and is internal to classical computer 102, but, alternatively or additionally, the volatile memory may be distributed over multiple packages and/or located externally with respect to classical computer 102.

Persistent Storage 911 is any form of non-volatile storage for computers that is now known or to be developed in the future. The non-volatility of this storage means that the stored data is maintained regardless of whether power is being supplied to classical computer 102 and/or directly to persistent storage 911. Persistent storage 911 may be a read only memory (ROM), but typically at least a portion of the persistent storage allows writing of data, deletion of data and re-writing of data. Some familiar forms of persistent storage include magnetic disks and solid state storage devices. Operating system 912 may take several forms, such as various known proprietary operating systems or open source Portable Operating System Interface type operating systems that employ a kernel. The code included in block 901 typically includes at least some of the computer code involved in performing the inventive methods.

Peripheral device set 913 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 914 may include components such as a display screen, speaker, microphone, wearable devices (such as goggles and smart watches), keyboard, mouse, printer, touchpad, game controllers, and haptic devices. Storage 915 is external storage, such as an external hard drive, or insertable storage, such as an SD card. Storage 915 may be persistent and/or volatile. In some embodiments, storage 915 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 916 is made up of sensors that can be used in Internet of Things applications. For example, one sensor may be a thermometer and another sensor may be a motion detector.

Network module 917 is the collection of computer software, hardware, and firmware that allows classical computer 102 to communicate with other computers through WAN 113. Network module 917 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 917 are performed on the same physical hardware device. In other embodiments (for example, embodiments that utilize software-defined networking (SDN)), the control functions and the forwarding functions of network module 917 are performed on physically separate devices, such that the control functions manage several different network hardware devices. Computer readable program instructions for performing the inventive methods can typically be downloaded to classical computer 102 from an external computer or external storage device through a network adapter card or network interface included in network module 917.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 902 is any computer system that is used and controlled by an end user (for example, a customer of an enterprise that operates classical computer 102), and may take any of the forms discussed above in connection with classical computer 102. EUD 902 typically receives helpful and useful data from the operations of classical computer 102. For example, in a hypothetical case where classical computer 102 is designed to provide a recommendation to an end user, this recommendation would typically be communicated from network module 917 of classical computer 102 through WAN 113 to EUD 902. In this way, EUD 902 can display, or otherwise present, the recommendation to an end user. In some embodiments, EUD 902 may be a client device, such as thin client, heavy client, mainframe computer, desktop computer and so on.

Remote server 903 is any computer system that serves at least some data and/or functionality to classical computer 102. Remote server 903 may be controlled and used by the same entity that operates classical computer 102. Remote server 903 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 918 of remote server 903.

Public cloud 904 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 904 is performed by the computer hardware and/or software of cloud orchestration module 920. The computing resources provided by public cloud 904 are typically implemented by virtual computing environments that run on various computers making up the computers of host physical machine set 921, which is the universe of physical computers in and/or available to public cloud 904. The virtual computing environments (VCEs) typically take the form of virtual machines from virtual machine set 922 and/or containers from container set 923. It is understood that these VCEs may be stored as images and may be transferred among and between the various physical machine hosts, either as images or after instantiation of the VCE. Cloud orchestration module 920 manages the transfer and storage of images, deploys new instantiations of VCEs and manages active instantiations of VCE deployments. Gateway 919 is the collection of computer software, hardware, and firmware that allows public cloud 904 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 905 is similar to public cloud 904, except that the computing resources are only available for use by a single enterprise. While private cloud 905 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 904 and private cloud 905 are both part of a larger hybrid cloud.

Block 901 further includes the software components discussed above in connection with FIGS. 2-8 to identify a dynamical decoupling sequence for error suppression on a quantum computer. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for identifying a dynamical decoupling sequence for error suppression on a quantum computer, may be embodied in an application specific integrated circuit.

As stated above, quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes. Various error suppression techniques have been developed to attempt to suppress errors, such as from quantum decoherence. Such error suppression techniques attempt to reduce the likelihood of hardware error while quantum bits are being manipulated or used for memory storage. It uses the physics and techniques of the field of quantum control in order to build resilience against error into the operation of quantum hardware. Overall there are many strategies to implement error suppression for the different types of operations and tasks undertaken in quantum computers. By protecting all the operations in a quantum algorithm from error, these strategies can push hardware to its limits, closing the gap between the actual algorithmic performance achieved and the theoretical limits imposed by hardware. One type of error suppression strategy is using dynamical decoupling. Dynamical decoupling is an open-loop quantum control technique employed in quantum computing to suppress quantum decoherence by taking advantage of rapid, time-dependent control modulation. In particular, dynamical decoupling may be used to remove non-Markovian and cross-talk errors during quantum computations. In its simplest form, dynamical decoupling is implemented by periodic sequences of near-instantaneous control pulses, whose net effect is to approximately average the unwanted system-environment coupling to zero. Different schemes exist for designing dynamical decoupling protocols that use realistic bounded-strength control pulses, as well as for achieving high-order error suppression, and for making dynamical decoupling compatible with quantum gates. However, such schemes require that the quantum device and the quantum circuit under consideration match the noise and imperfection criteria that the theoretically motivated sequences are effective against. The difficulty in finding the appropriate dynamical decoupling sequence for a task and a device is further compounded by the complex and dynamic nature of quantum hardware. That is, the user of the quantum device might not be equipped to comprehensively capture the device's shortcomings let alone find a dynamical decoupling sequence well-suited for the task. Hence, there is not currently a means for empirically identifying effective dynamical decoupling sequences for error suppression on a quantum computer.

Figure 10:
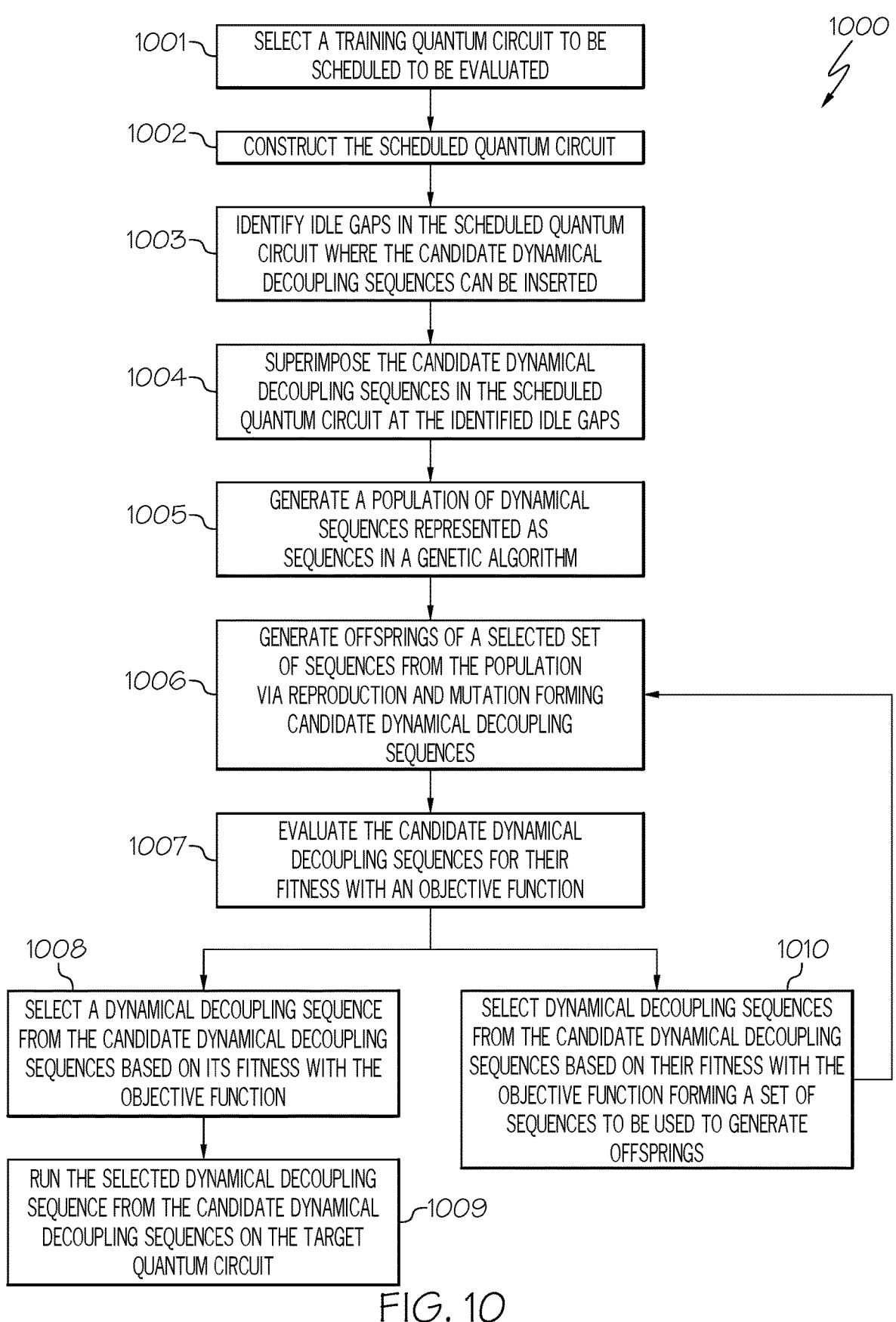
FIG. 10 is a flowchart of a method for identifying a dynamical decoupling sequence for error suppression on a quantum computer in accordance with an embodiment of the present disclosure.

The embodiments of the present disclosure provide the means for identifying dynamical decoupling sequences for error suppression on a quantum computer by employing a genetic algorithm to search the space of candidate error suppression strategies (possible dynamical decoupling sequences) for the optimal candidate error suppression strategy as discussed below in connection with FIGS. 10-12. FIG. 10 is a flowchart of a method for identifying a dynamical decoupling sequence for error suppression on a quantum computer (e.g., quantum computer 101). FIG. 11 is a flowchart of a method for generating offsprings from a selected set of parents via reproduction. FIG. 12 is a flowchart of a method for generating offsprings from a selected set of parents and/or offsprings via mutation.

As stated above, FIG. 10 is a flowchart of a method 1000 for identifying a dynamical decoupling sequence for error suppression on a quantum computer (e.g., quantum computer 101) in accordance with an embodiment of the present disclosure.

Referring to FIG. 10, in conjunction with FIGS. 1-9, in step 1001, generating engine 201 of classical computer 102 selects a training quantum circuit to be scheduled to be evaluated.

In one embodiment, generating engine 201 obtains training quantum circuits that have the same circuit structure as the target quantum circuit. Training quantum circuits, as used herein, refer to quantum circuits that the genetic algorithm will optimize. Such quantum circuits may have the same circuit structure as the target quantum circuits, but the individual gates will be different. Target quantum circuits, as used herein, refer to the quantum circuits that are to be maximized.

In one embodiment, such training quantum circuits are obtained from the target quantum circuit via cliffordizing and/or mirroring. Cliffordizing, as used herein, refers to changing the non-Clifford gates to Clifford gates while preserving the structure of the quantum circuit. Mirroring, as used herein, refers to creating a mirrored version of the target quantum circuit. In one embodiment, a mirrored circuit is a circuit whose second half is the first half inverted in gate order and with gates replaced by their inverses, such that the entire circuit is equivalent to the identity.

In one embodiment, generating engine 201 selects one of the obtained training quantum circuits to be scheduled to be evaluated as well as selects a suitable objective function on the selected training quantum circuit for the algorithm of the present disclosure (method 1000) to optimize in order to identify the best dynamical decoupling sequence for error suppression on a quantum computer.

In step 1002, constructing engine 202 of classical computer 102 constructs the scheduled quantum circuit corresponding to the selected training quantum circuit.

As stated above, in one embodiment, the scheduled quantum circuit corresponds to the selected training quantum circuit with the same circuit structure as the target quantum circuit. By constructing a scheduled quantum circuit, constructing engine 202 is able to search the product space of dynamical decoupling sequences on adjacent qubits to mitigate crosstalk.

In one embodiment, such quantum circuits are k-colored, such that each qubit represents a vertex and each edge represents a two-qubit gate. For example, each qubit and two-qubit gate may be represented in a graph of vertices and edges designated with a particular color as illustrated in FIG. 5.

Referring to FIG. 5, each qubit and two-qubit gate is represented in a graph by a vertex and edge, respectively, where each qubit and two-qubit gate is color coded (represented as a different shade). For example, qubits $q_0$ and $q_5$ are represented by color 501 (shown as a shade in FIG. 5), qubits $q_1$ and $q_3$ are represented by color 502 (shown as a shade in FIG. 5), qubits $q_2$ and $q_4$ are represented by color 503 (shown as a shade in FIG. 5), and two-qubit gates are represented by color 504 (shown as a shade in FIG. 5). In one embodiment, colors are chosen in the graph such that adjacent vertices do not share the same color.

The genetic dynamical decoupling search may then be implemented in parallel across each of the colors. As a result, the genetic algorithm can be run directly on the physical qubits thereby optimizing the dynamical decoupling sequences for the device and problem at hand. In this manner, the search of the produce space of dynamical decoupling sequences on adjacent qubits can occur which mitigates crosstalk and effectively includes staggered dynamical decoupling sequences in the search space. It is noted that any number of colors may be utilized corresponding to the number of qubits.

In one embodiment, constructing engine 202 constructs the scheduled quantum circuit using the scheduler function of Qiskit® to translates a quantum circuit (e.g., training quantum circuit) into a pulse schedule using gate and measurement calibrations. Other software tools that may be used by constructing engine 202 to construct a scheduled quantum circuit (e.g., training quantum circuit) include, but are not limited to, Classiq®, Open QL®, ProjectQ®, etc.

In step 1003, constructing engine 202 of classical computer 102 identifies idle gaps in the scheduled quantum circuit where the candidate dynamical decoupling sequences can be inserted. Idle gaps, as used herein, refer to locations where no operations are being performed as illustrated in FIG. 6.

For instance, as illustrated in FIG. 6, such idle gaps 601 correspond to locations where dynamical decoupling sequences can be inserted.

In step 1004, constructing engine 202 of classical computer 102 superimposes the candidate dynamical decoupling sequences in the scheduled quantum circuit (e.g., scheduled quantum circuit 600) at the identified idle gaps (e.g., idle gaps 601) as illustrated in FIG. 7.

As shown in FIG. 7, the candidate dynamical decoupling sequences, such as the offsprings 304 from parents 301 and parents 301, are superimposed in scheduled quantum circuit 600 at the identified idle gaps 601 as shown via element 701.

In step 1005, generating engine 201 of classical computer 102 generates a population of dynamical decoupling sequences represented as sequences in a genetic algorithm.

As discussed above, a dynamical decoupling sequence during an idle gap in the quantum circuit is comprised of pulses $\{P_j\}$ applied at intervals $\{\tau_j\}$ with the goal of cancelling the system-environment interactions. The dynamical decoupling sequence for a quantum circuit, as used herein, is where the dynamical decoupling sequence for each idle gap is applied individually and based on the color coding for the corresponding qubit. Color coding, as used herein, refers to associating each qubit with a designated color. A genetic algorithm, as used herein, refers to a heuristic approach to optimize an objective function on a high-dimensional space whose members can be represented as a dynamical decoupling sequence for a quantum circuit. A sequence, as used herein, is one of the solutions in the population.

In one embodiment, generating engine 201 selects a decoupling group, for instance $\{I, X, Y, Z\}$, the elements of which form the pulse in the dynamical decoupling sequence. In one embodiment, the dynamical decoupling sequences include pulses applied at intervals, where each pulse corresponds to a gene of a sequence. The genes of a sequence correspond to the elements of the sequence. For example, if the dynamical decoupling sequence was represented by the sequence $\{I, X, Y, Z, I', X', Y', Z'\}$, then such elements, such as "X," "Y," "Z," etc. correspond to the genes of the sequence.

An "individual," as used herein, refers to a dynamical decoupling sequence for the quantum circuit as well a set of dynamical decoupling sequences on each idle gap, applied color-wise to the full quantum circuit. For example, if there are two colors, then an individual may correspond to $\{XYXY, YZYZ\}$ based on the elements $\{X, Y, Z\}$.

In one embodiment, each dynamical decoupling sequence in each idle gap multiplies to I (identity operator). Such a requirement is referred to herein as the identity operation constraint.

In one embodiment, generating engine 201 generates a population that consists of an n parent population, where n is a positive integer number. A "parent," as used herein, refers to a sequence that is used to generate offsprings as discussed further below.

In one embodiment, generating engine 201 generates 2Q offsprings from Q parents, where Q is a positive integer number.

In one embodiment, the starting population of dynamical decoupling sequences represented as sequences in a genetic algorithm has uniformity. In one embodiment, in the starting population, every group element (every element of the sequence) occurs at every position in some individual sequence. For example, the population size of 8 with a length of 8 elements {I, X, Y, Z} would have each group element appear twice in each position among all the sequences. For example, the following 8 sequences with a length of 8 may be generated with the elements {I, X, Y, Z}: (1) {I, X, Y, Z, I, X, Y, Z}; (2) {X, Y, Z, I, X, Y, Z, I}; (3) {Y, Z, I, X, Y, Z, I, X}; (4) {Z, I, X, Y, Z, I, X, Y}; (5) {I, Y, X, Z, I, Y, X, Z}; (6) {Y, X, Z, I, Y, X, Z, I}; (7) {X, Z, I, Y, X, Z, I, Y}; and (8) {Z, I, X, Y, Z, I, X, Y}. By utilizing the strategy of uniformity for the initial population, directional bias towards any individual dynamical decoupling sequence is minimized. That is, the evolution that occurs during the running of the genetic algorithm is due to increasing fitness (how close a given design solution is to achieving the set aims) as opposed to initial luck.

In one embodiment, the starting population of dynamical decoupling sequences involves establishing a group of decoupling pulses, sequence lengths for the dynamical decoupling sequences in each idle gap, and subsets of backend qubits over which the space of all fixed length dynamical decoupling sequences constructed from the pulses in the decoupling group is searched.

In one embodiment, generating engine 201 generates an initial population of individuals, where every individual has a dynamical decoupling sequence to be padded to qubits of a given color for every color. In one embodiment, generating engine 201 constructs such an initial population by randomly generating group elements or with additional restrictions, such as imposing non-directionality in the offspring generation.

In step 1006, generating engine 201 of classical computer 102 generates offsprings of a selected set of sequences ("parents") from the population via reproduction and mutation forming candidate dynamical decoupling sequences. A "candidate dynamical decoupling sequence," as used herein, refers to a dynamical decoupling sequence that may be selected to either be used as a "parent" in a subsequent iteration for generating offsprings or may be selected as the dynamical decoupling sequence to be run on the target quantum circuit. The target quantum circuit, as used herein, refers to the quantum circuit whose performance is to be maximized.

A discussion regarding generating offsprings of a selected set of sequences ("parents") from the population via reproduction is discussed below in connection with FIG. 11.

FIG. 11 is a flowchart of a method 1100 for generating offsprings from a selected set of parents via reproduction in accordance with an embodiment of the present disclosure.

Referring to FIG. 11, in conjunction with FIGS. 1-10, in step 1101, generating engine 201 of classical computer 102 selects two parents from the population of dynamical decoupling sequences represented as sequences as shown in FIG. 3.

As stated above, in one embodiment, generating engine 201 selects such two parents with better fitness from the population of dynamical decoupling sequences represented as sequences. In one embodiment, generating engine 201 selects such two parents randomly from the population of dynamical decoupling sequences represented as sequences. In one embodiment, generating engine 201 selects such two parents from the population of dynamical decoupling sequences represented as sequences which have not previously been selected.

As shown in FIG. 3, parents 301A, 301B were selected to create offsprings, where parent 301A corresponds to the sequence with the elements {X, Y, I, Z, X, Z, I, Y} and where parent 301B corresponds to the sequence with the elements {Y, I, I, Z, Z, X, X, Y}.

In step 1102, generating engine 201 of classical computer 102 selects a random splice location at the selected parents 301A, 301B (i.e., at the selected sequences 301A, 301B). "Splice," as used herein, refers to designating a position of the sequence at which a pulse (a group of genes), such as pulses 303A, 303B of parents 301A, 301B, respectively, will be exchanged among the parents. For example, as shown in FIG. 3, splice locations 302A, 302B were selected from parents 301A, 301B, respectively. The pulse (e.g., pulses 303A, 303B) at the splice location (e.g., splice locations 302A, 302B) is used to satisfy the constraint that dynamical decoupling sequences need to add to the identity operation.

In step 1103, generating engine 201 of classical computer 102 generates offsprings 304A, 304B by exchanging pulses 303B, 303A, respectively, as shown in FIG. 3.

In step 1104, generating engine 201 of classical computer 102 sets a pulse at the splice location 302A, 302B of offsprings 304A, 304B, respectively, to satisfy a constraint on the dynamical decoupling space thereby forming an offspring reproduced from the selected two sequences. For example, the pulse of Y may be set at splice location 302A.

Alternatively, offsprings, such as offsprings 304, are generated from the selected set of sequences ("parents") via mutation as discussed below in connection with FIG. 12.

FIG. 12 is a flowchart of a method 1200 for generating offsprings from a selected set of parents and/or offsprings via mutation in accordance with an embodiment of the present disclosure.

Referring to FIG. 12, in conjunction with FIGS. 1-10, in step 1201, generating engine 201 of classical computer 102 changes one pulse at a random location (e.g., location 401) in offspring 304 (e.g., offspring 304A) of parents 301 (e.g., parents 301A, 301B), such as from Y (see location 401) to Z (see location 402) as shown in FIG. 4. Alternatively, such a gene may be changed at a random location in parent 301.

In step 1202, generating engine 201 of classical computer 102 modifies a pulse at a second random location (see location 403) of the offspring 304 (e.g., offspring 304A) to satisfy the identity operation constraint (multiplication to I) thereby forming an offspring 304C that is mutated from the selected two sequences (parents 301A, 301B).

As discussed above, in one embodiment, the mutation rate can be varied according to the current rate of convergence criteria, the current fitness of the population, or some other criteria. By having a dynamic mutation rate, the population is prevented from being trapped in a local maxima and converges to a high fitness population.

In one embodiment, in order to achieve genetic algorithm success, the probability that any offspring 304 will mutate can be dynamically changed according to the population. For example, if one dynamical decoupling sequence is much better than the rest of the population, then such genes may be desired to spread. As a result, it may be desirable to decrease mutations. In contrast, if the entire population is performing similarly, then it may be desirable to identify a sequence that performs better. As a result, it may be desirable to increase mutations.

In one embodiment, generating engine 201 utilizes functions F(P) for determining if population P should mutate. Example functions F(P) include the range function $F=P_{max}-P_{min}$, the relative range function $F=(P_{max}-P_{min})/P_{min}$, or the standard deviation function $F=\sigma_p$.

In one embodiment, generating engine 201 utilizes various mutation methods (e.g., if F(P) is less than or greater than a value, then mutation is accordingly adjusted, such as increased or decreased), such as the probability that a dynamical decoupling sequence undergoes a single mutation, a number of mutation sites per dynamical decoupling sequence, or the probability of introducing new random individuals to the population.

Returning to FIG. 10, in conjunction with FIGS. 1-9 and 11-12, in step 1007, evaluation engine 203 of classical computer 102 evaluates the candidate dynamical decoupling sequences for their fitness with an objective function.

As discussed above, fitness, as used herein, refers to how close a given design solution is to achieving the set aims, which in this case refers to the objective function. An objective function, as used herein, refers to a real-valued function whose value is to be either minimized or maximized over the set of feasible alternatives. As previously discussed, a genetic algorithm is a heuristic approach to optimize an objective function on a high dimensional space whose members can be represented as "sequences." The objective function discussed above refers to the objective function to be optimized via the genetic algorithm of the present disclosure.

In one embodiment, the objective function measures the performance of the quantum circuit (e.g., training quantum circuit with the superimposed candidate dynamical decoupling sequences) by success probability ($p_{success}$), fidelity ($\langle \psi_{desired}|\rho|\psi_{desired}\rangle$), or the distance from a desired probability distribution ($|\vec{P}_{observed}-\vec{P}_{desired}|$).

In one embodiment, such an evaluation occurs on quantum computer 101. That is, the scheduled quantum circuit with the superimposed candidate dynamical decoupling sequences is executed to run on quantum computer 101. Hence, in one embodiment, classical computer 102 implements a genetic algorithm search on the space of possible dynamical decoupling sequences while quantum computer 101 tests the viability of the dynamical decoupling sequence.

As discussed above, in one embodiment, evaluation engine 203 evaluates the dynamical decoupling sequences based on their fitness to the objective function, which is illustrated in FIG. 8.

In step 1008, evaluation engine 203 of classical computer 102 selects the best dynamical decoupling sequence from the candidate dynamical decoupling sequences based on its fitness with the objective function. As shown in FIG. 8, such fitness may correspond to a value 801 as to how close the dynamical decoupling sequence achieves the objective function. In one embodiment, the higher the value, the closer the dynamical decoupling sequence achieves the objective function and vice-versa. In one embodiment, evaluation engine 203 selects the best dynamical decoupling sequence from the candidate dynamical decoupling sequences based on its fitness with the objective function when its fitness with the objective function exceeds a threshold value, which may be user-designated.

In step 1009, upon selecting the best dynamical decoupling sequence from the candidate dynamical decoupling sequences based on its fitness with the objective function, evaluation engine 203 of classical computer 102 runs the selected dynamical decoupling sequence on the target quantum circuit, which is executed on quantum computer 101.

Alternatively to steps 1008-1009, in step 1010, evaluation engine 203 of classical computer 102 selects the dynamical decoupling sequences from the candidate dynamical decoupling sequences based on their fitness with the objective function forming a set of sequences to be used to generate further offsprings in step 1006.

As stated above, such selected dynamical decoupling sequences correspond to the fittest candidates 802, which will be used for the parents in the next iteration of selecting offsprings 304. Such fittest candidates 802 may correspond to those parents 301, offsprings 304 with a fitness value 801 that exceeds a threshold value, which may be user-designated. In one embodiment, such fittest candidates 802 may correspond to those parents 301, offsprings 301 with a fitness value 801 that exceeds a first threshold value, which may be user-designated, but less than a second threshold value, which may be user-designated. The second threshold value may correspond to the value that the fitness value 801 needs to exceed in order to complete the iterations of generating offsprings 304, where such a dynamical decoupling sequence that exceeds the second threshold value is designated as the best dynamical decoupling sequence to be selected and run on the target quantum circuit.

Furthermore, in one embodiment, the algorithm of the present disclosure runs on a population of individuals to evolve such a population of individuals towards higher-fitness individuals. The fitness of each individual is evaluated by applying its sequences on the training quantum circuit according to the qubit color. As shown in FIG. 8, such parents 301, offsprings 304 are individuals with sequences over multiple colors (illustrated by different shades).

In one embodiment, the technique discussed above in identifying the dynamical decoupling sequence for error suppression on quantum computer 101 can be generalized to cases where the expected output of the target quantum circuit (or family of quantum circuits) and the objective function are unknown or hard to compute.

As a result of empirically searching the space of dynamical decoupling sequences, dynamical decoupling sequences for error suppression on quantum computer 101 are more effectively identified.

In one embodiment, the family of sequences that the genetic algorithm scheme of the present disclosure identified could be analyzed for its robustness to the various error parameters that affect dynamical decoupling performance. Such an analysis could reveal features of the quantum device as dynamical decoupling can be used to infer errors plaguing quantum computer 101. Secondly, a theoretical analysis of the dynamical decoupling sequences may aid in deterministic theoretical schemes to design dynamical decoupling sequences which do not yet exist.

Furthermore, the genetic algorithm scheme of the present disclosure optimizes performance of the quantum circuit when the quantum results are not known a priori and not able to be simulated. As a result, quantum tasks can be optimized for which the classical counterpart is hard or impossible.

Additionally, the genetic algorithm scheme of the present disclosure is scalable to large quantum devices.

Furthermore, comprehensive analysis of the best performing dynamical decoupling sequences can be used to determine the most significant noise sources in a quantum device (e.g., quantum computer 101) by determining the types of errors that the sequences cancel. As a result, an analysis of the dynamical decoupling sequences can be used to identify and permanently remove complex error sources.

As a result of the foregoing, optimal dynamical decoupling sequences are effectively identified for error suppression on a quantum computer.

Furthermore, the principles of the present disclosure improve the technology or technical field involving error suppression strategies.

As discussed above, quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes. Various error suppression techniques have been developed to attempt to suppress errors, such as from quantum decoherence. Such error suppression techniques attempt to reduce the likelihood of hardware error while quantum bits are being manipulated or used for memory storage. It uses the physics and techniques of the field of quantum control in order to build resilience against error into the operation of quantum hardware. Overall there are many strategies to implement error suppression for the different types of operations and tasks undertaken in quantum computers. By protecting all the operations in a quantum algorithm from error, these strategies can push hardware to its limits, closing the gap between the actual algorithmic performance achieved and the theoretical limits imposed by hardware. One type of error suppression strategy is using dynamical decoupling. Dynamical decoupling is an open-loop quantum control technique employed in quantum computing to suppress quantum decoherence by taking advantage of rapid, time-dependent control modulation. In particular, dynamical decoupling may be used to remove non-Markovian and cross-talk errors during quantum computations. In its simplest form, dynamical decoupling is implemented by periodic sequences of near-instantaneous control pulses, whose net effect is to approximately average the unwanted system-environment coupling to zero. Different schemes exist for designing dynamical decoupling protocols that use realistic bounded-strength control pulses, as well as for achieving high-order error suppression, and for making dynamical decoupling compatible with quantum gates. However, such schemes require that the quantum device and the quantum circuit under consideration match the noise and imperfection criteria that the theoretically motivated sequences are effective against. The difficulty in finding the appropriate dynamical decoupling sequence for a task and a device is further compounded by the complex and dynamic nature of quantum hardware. That is, the user of the quantum device might not be equipped to comprehensively capture the device's shortcomings let alone find a dynamical decoupling sequence well-suited for the task. Hence, there is not currently a means for empirically identifying effective dynamical decoupling sequences for error suppression on a quantum computer.

Embodiments of the present disclosure improve such technology by generating a population of dynamical decoupling sequences represented as sequences in a genetic algorithm. A dynamical decoupling sequence during an idle gap (locations where no operations are being performed) in the quantum circuit is comprised of pulses $\{P_j\}$ applied at intervals $\{\tau_j\}$ with the goal of cancelling the system-environment interactions. The dynamical decoupling sequence for a quantum circuit, as used herein, is where the dynamical decoupling sequence for each idle gap is applied individually and based on the color coding for the corresponding qubit. Color coding, as used herein, refers to associating each qubit with a designated color. A genetic algorithm, as used herein, refers to a heuristic approach to optimize an objective function on a high-dimensional space whose members can be represented as a dynamical decoupling sequence for a quantum circuit. A sequence, as used herein, is one of the solutions in the population. Offsprings of a selected set of sequences ("parents") from the population are then generated via reproduction and mutation forming candidate dynamical decoupling sequences. A "candidate dynamical decoupling sequence," as used herein, refers to those dynamical decoupling sequences that may be selected to either be used as a "parent" in a subsequent iteration for generating offsprings or selected as the dynamical decoupling sequence to be run on the target quantum circuit. The target quantum circuit, as used herein, refers to the quantum circuit whose performance is to be maximized. One or more dynamical decoupling sequences may be selected from the candidate dynamical decoupling sequences based on their fitness with the objective function. In one embodiment, the best dynamical decoupling sequence is selected from the candidate dynamical decoupling sequences based on its fitness with the objective function. Upon selecting the best dynamical decoupling sequence from the candidate dynamical decoupling sequences, the selected dynamical decoupling sequence is run on the target quantum circuit, which is executed on the quantum computer. Alternatively, dynamical decoupling sequences are selected from the candidate dynamical decoupling sequences based on their fitness with the objective function forming a set of sequences to be used to generate further offsprings in a further iteration of the genetic algorithm. In this manner, the optimal dynamical decoupling sequence for error suppression on a quantum computer is identified. Furthermore, in this manner, there is an improvement in the technical field involving error suppression strategies.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying dynamical decoupling sequences for error suppression on a quantum computer, the method comprising:

generating a population of dynamical decoupling sequences for a quantum circuit represented as sequences in a genetic algorithm, wherein each of said dynamical decoupling sequences for said quantum circuit is based on a color coding for a corresponding qubit;

generating offsprings of said sequences from reproduction and mutation forming candidate dynamical decoupling sequences;

selecting a dynamical decoupling sequence from said candidate dynamical decoupling sequences based on its fitness with an objective function; and running said selected dynamical decoupling sequence on a target quantum circuit.

2. The method as recited in claim 1, wherein said dynamical decoupling sequences comprise pulses applied at intervals, wherein each of said dynamical decoupling sequences in each idle gap in a scheduled quantum circuit multiplies to I, wherein said idle gap corresponds to a location in said scheduled quantum circuit where no operations are being performed in said scheduled quantum circuit.

3. The method as recited in claim 2 further comprising:

superimposing said candidate dynamical decoupling sequences on said scheduled quantum circuit to run said candidate dynamical decoupling sequences on said scheduled quantum circuit, wherein said candidate dynamical decoupling sequences are evaluated for their fitness with said objective function.

4. The method as recited in claim 3 further comprising:

selecting a plurality of dynamical decoupling sequences of said candidate dynamical decoupling sequences based on their fitness with said objective function, wherein said selected dynamical decoupling sequences are used as a second set of sequences to be used to generate offsprings.

5. The method as recited in claim 3, wherein said scheduled quantum circuit corresponds to a training quantum circuit with a same circuit structure as said target quantum circuit.

6. The method as recited in claim 5, wherein said training quantum circuit is obtained from said target quantum circuit by cliffordizing and/or mirroring.

7. The method as recited in claim 5, wherein each qubit of said training quantum circuit is represented in a graph as a vertex designated with a particular color, wherein colors are chosen in said graph such that adjacent vertices do not share a same color.

8. The method as recited in claim 1 further comprising:

selecting two sequences as parents from said population of dynamical decoupling sequences;

selecting a splice location at said selected two sequences randomly;

generating offsprings by exchanging pulses from said selected two sequences; and setting a pulse at said splice location to satisfy a constraint on dynamical decoupling space thereby forming an offspring reproduced from said selected two sequences.

9. The method as recited in claim 1 further comprising:

changing one pulse at a random location in an offspring of two sequences; and modifying a pulse at a random location of said offspring to satisfy an identity operation constraint thereby forming an offspring mutated from said two sequences.

10. The method as recited in claim 9, wherein a rate of said mutation is dynamically modified.

11. A computer program product for identifying dynamical decoupling sequences for error suppression on a quantum computer, the computer program product comprising one or more computer readable storage mediums having program code embodied therewith, the program code comprising programming instructions for:

generating a population of dynamical decoupling sequences for a quantum circuit represented as sequences in a genetic algorithm, wherein each of said dynamical decoupling sequences for said quantum circuit is based on a color coding for a corresponding qubit;

generating offsprings of said sequences from reproduction and mutation forming candidate dynamical decoupling sequences;

selecting a dynamical decoupling sequence from said candidate dynamical decoupling sequences based on its fitness with an objective function; and running said selected dynamical decoupling sequence on a target quantum circuit.

12. The computer program product as recited in claim 11, wherein said dynamical decoupling sequences comprise pulses applied at intervals, wherein each of said dynamical decoupling sequences in each idle gap in a scheduled quantum circuit multiplies to I, wherein said idle gap corresponds to a location in said scheduled quantum circuit where no operations are being performed in said scheduled quantum circuit.

13. The computer program product as recited in claim 12, wherein the program code further comprises the programming instructions for:

superimposing said candidate dynamical decoupling sequences on said scheduled quantum circuit to run said candidate dynamical decoupling sequences on said scheduled quantum circuit, wherein said candidate dynamical decoupling sequences are evaluated for their fitness with said objective function.

14. The computer program product as recited in claim 13, wherein the program code further comprises the programming instructions for:

selecting a plurality of dynamical decoupling sequences of said candidate dynamical decoupling sequences based on their fitness with said objective function, wherein said selected dynamical decoupling sequences are used as a second set of sequences to be used to generate offsprings.

15. The computer program product as recited in claim 13, wherein said scheduled quantum circuit corresponds to a training quantum circuit with a same circuit structure as said target quantum circuit.

16. The computer program product as recited in claim 15, wherein said training quantum circuit is obtained from said target quantum circuit by cliffordizing and/or mirroring.

17. The computer program product as recited in claim 15, wherein each qubit of said training quantum circuit is represented in a graph as a vertex designated with a particular color, wherein colors are chosen in said graph such that adjacent vertices do not share a same color.

18. The computer program product as recited in claim 11, wherein the program code further comprises the programming instructions for:

selecting two sequences as parents from said population of dynamical decoupling sequences;

selecting a splice location at said selected two sequences randomly;

generating offsprings by exchanging pulses from said selected two sequences; and setting a pulse at said splice location to satisfy a constraint on dynamical decoupling space thereby forming an offspring reproduced from said selected two sequences.

19. A system, comprising:

a memory for storing a computer program for identifying dynamical decoupling sequences for error suppression on a quantum computer; and a processor connected to said memory, wherein said processor is configured to execute program instructions of the computer program comprising:

generating a population of dynamical decoupling sequences for a quantum circuit represented as sequences in a genetic algorithm, wherein each of said dynamical decoupling sequences for said quantum circuit is based on a color coding for a corresponding qubit;

generating offsprings of said sequences from reproduction and mutation forming candidate dynamical decoupling sequences;

selecting a dynamical decoupling sequence from said candidate dynamical decoupling sequences based on its fitness with an objective function; and running said selected dynamical decoupling sequence on a target quantum circuit.

20. The system as recited in claim 19, wherein said dynamical decoupling sequences comprise pulses applied at intervals, wherein each of said dynamical decoupling sequences in each idle gap in a scheduled quantum circuit multiplies to I.

* * * * *